United States Patent [19]

Sanders, Jr. et al.

[11] Patent Number: 5,740,051
[45] Date of Patent: *Apr. 14, 1998

[54] 3-D MODEL MAKING

[75] Inventors: Royden C. Sanders, Jr., Wilton; John L. Forsyth, S. Lyndeborough; Kempton F. Philbrook, Lyndeborough, all of N.H.

[73] Assignee: Sanders Prototypes, Inc., Wilton, N.H.

[*] Notice: The term of this patent shall not extend beyond the expiration date of Pat. No. 5,506,607.

[21] Appl. No.: 555,037

[22] Filed: Nov. 8, 1995

Related U.S. Application Data

[63] Continuation-in-part of Ser. No. 378,947, Jan. 26, 1995, Pat. No. 5,506,607, which is a continuation of Ser. No. 112,437, Aug. 26, 1993, abandoned, which is a continuation-in-part of Ser. No. 87,705, Jul. 9, 1993, abandoned, which is a continuation-in-part of Ser. No. 646,153, Jan. 25, 1991, abandoned.

[51] Int. Cl.$^6$ .................................................. G06F 19/00
[52] U.S. Cl. ................................. 364/468.26; 364/474.24
[58] Field of Search .................... 364/468, 474.24, 364/476, 477, 468.25–468.27, 475.01; 264/308, 309, 401, 460, 255, 317, 482, 40.1, 122; 156/379.6, 272.8, 273.3, 64, 58; 347/1, 23, 37; 164/46; 118/695; 425/375; 427/466

[56] References Cited

U.S. PATENT DOCUMENTS

| | | | |
|---|---|---|---|
| 3,222,776 | 12/1965 | Kawecki | 29/503 |
| 3,892,506 | 7/1975 | Dann | 425/78 |
| 3,968,498 | 7/1976 | Uchiyama | 347/2 |
| 4,247,508 | 1/1981 | Householder | 264/219 |
| 4,486,761 | 12/1984 | Tarnowski | 346/161 |
| 4,575,330 | 3/1986 | Hull | 425/174.4 |
| 4,621,273 | 11/1986 | Anderson | 347/40 X |
| 4,665,492 | 5/1987 | Masters | 364/468 |
| 4,737,858 | 4/1988 | DeBaryshe | 358/296 |
| 4,920,422 | 4/1990 | Lapierre | 347/2 X |
| 5,014,207 | 5/1991 | Lawton | 364/468 |
| 5,029,266 | 7/1991 | Randolph | 320/31 |
| 5,059,266 | 10/1991 | Yamane | 156/64 |
| 5,121,329 | 6/1992 | Crump | 364/468 |
| 5,126,754 | 6/1992 | Spinar | 347/6 |
| 5,132,248 | 7/1992 | Drummond | 347/1 X |
| 5,136,515 | 8/1992 | Helinski | 364/468 |
| 5,141,680 | 8/1992 | Almquist et al. | 264/401 |
| 5,143,817 | 9/1992 | Lawton et al. | 430/269 |
| 5,149,548 | 9/1992 | Yamane et al. | 425/174.4 |
| 5,151,813 | 9/1992 | Yamamoto | 359/202 |
| 5,184,307 | 2/1993 | Hull et al. | 364/474.24 |
| 5,204,055 | 4/1993 | Sachs | 419/2 |
| 5,216,616 | 6/1993 | Masters | 364/474.24 |
| 5,257,657 | 11/1993 | Gore | 164/64 |
| 5,260,009 | 11/1993 | Penn | 264/401 |
| 5,303,141 | 4/1994 | Batchelder | 364/149 |
| 5,402,351 | 3/1995 | Batchelder et al. | 364/468 |
| 5,490,962 | 2/1996 | Cima et al. | 264/401 |
| 5,506,607 | 4/1996 | Sanders, Jr. et al. | 347/1 |

FOREIGN PATENT DOCUMENTS

| | | | |
|---|---|---|---|
| 0 500 225 A1 | 8/1992 | European Pat. Off. | B29C 67/00 |
| 0 529 816 A1 | 3/1993 | European Pat. Off. | G05B 19/403 |
| WO 92/18323 | 10/1992 | WIPO | B29C 67/02 |

*Primary Examiner*—Reba I. Elmore
*Assistant Examiner*—Steven R. Garland
*Attorney, Agent, or Firm*—Davis and Bujold

[57] ABSTRACT

A method of and apparatus for producing a 3-D model by forming a continuous plurality of parallel layers of modeling material comprising a) producing a plurality of bead producing drops of the modeling material for deposition at desired locations b) controlling the locations and timing of deposition to produce vectors, in any and all directions required to produce an outer surface defining wall of said required layer with a desired surface finish; c) adjusting the distance of the location of drop production to the location of drop deposition in preparation for the formation of a subsequent said layer; and d) repeating steps a), b), and c) as required to complete the model.

52 Claims, 10 Drawing Sheets

3-D MODEL MAKING

This application is a continuation-in-part of U.S. application Ser. No. 378,947 filed Jan. 26, 1995, now U.S. Pat. No. 5,506,607, which is a continuation of U.S. application Ser. No. 112,437, Aug. 26, 1993, now abandoned, which is a continuation-in-part of U.S. application Ser. No. 87,705, Jul. 9, 1993, now abandoned, which is a continuation-in-part of U.S. application Ser No. 646,153, Jan. 25, 1991, now abandoned.

This invention relates to methods for use in a 3-D model maker utilizing drop on demand jet, continuous stream jet and vector plotting technology, and to a model making apparatus for performing the methods.

BACKGROUND OF THE INVENTION

3-D model making at the present time is exemplified by the following patents:

Householder, U.S. Pat. No. 4,247,508, discloses two substances, one a fill material and the other a support material, deposited layer by layer to build an article. The two materials in each layer are not in contact with each other while the layer is being formed because Householder uses a grid to separate the two materials as they are being deposited. After the materials in each layer are deposited, the grid is moved to the next layer so that the two materials may fill the space left by the removed grid and thereafter solidify in contact with each other in the same layer.

In Helinski, U.S. Pat. 5,136,515, a three dimensional model is produced layer by layer by raster scanning and simultaneously jetting droplets of at least two solidifiable materials, one material forming the article and a second material forming a support for the article. The second material is subsequently removed by heating, cutting, melting, chemical reacting, etc. to leave the desired article.

Penn, U.S. Pat. No. 5,260,009, discloses a system and process for making 3-dimensional objects by dispensing layer upon layer of modelling material using an inkjet which is turned on or off according to a 2-dimensional data map of each layer of the object. The 2-D data map is stored and relayed by a microprocessor and defines locations on a matrix at which printing is to occur in a manner such as is used in printing images using raster scan printing.

The proposals previously made including those exemplified above, which are believed to be the most pertinent, are replete with problems which result in severe limitations with respect to the dimensional accuracy and quality of surface finish, and/or the complexity of shapes that can be produced which render them unsatisfactory in meeting today's requirements with respect to these parameters.

It is an object of the present invention to provide 3-D model making methods which provide a significant improvement, relative to previous proposals, with respect to the achievement of desired dimensional accuracy, quality of surface finish, on all surfaces, combined with the ability to manufacture the complex shapes specified by today's requirements.

SUMMARY OF THE INVENTION

The above and other objects are achieved by the present invention, by producing a 3-D model with a method comprised of the following steps. Providing a surface for supporting the 3-D model during production. Ejecting bead producing drops of modeling material one drop at a time, upon demand from a drop on demand jet head onto the support surface. Moving the jet head and support surface relative to each other in an X, Y coordinate system parallel to the support surface, under the control of a control means, while ejecting bead producing drops from the jet head, to generate vectors of modeling material in all directions required to produce a layer of the model. After completion of a layer of the model, moving the jet head and the support surface relative to each other in a Z coordinate direction normal to the support surface under the control of the control means. Moving the jet head and support means relative to each other in the X, Y coordinate system under the control of the control means to form a next layer of the model on top of the previously formed layer. Repeating the above steps to sequentially produce the model layer upon layer, one layer at a time, until the model is completed.

The present invention relates to a method of producing a 3-D model by forming a contiguous plurality of parallel layers of modeling material comprising the following steps. Producing a plurality of bead producing drops of the modeling material for deposition at desired locations to solidify into beads to form at least a portion of a said layer. Controlling the locations of deposition to produce vectors, defined by overlapping pluralities of the beads, in any and all directions required to produce, by vector plotting, at least a desired outer surface defining wall of said layer. Timing the production of said plurality of beads, at least, when producing said desired outer surface defining walls of said layer to overlap previously deposited beads to a desired extent and to meld with previously deposited beads to produce said vectors, thereby forming said desired outer surface defining walls with a desired surface finish. Adjusting the distance of the location of drop production to the location of drop deposition following formation of said layer in preparation for the formation of a subsequent said layer. Finally, repeating the above steps as required to complete the model.

The invention also relates to a method of producing a 3-D model comprising the following steps. Supporting the 3-D model during production. Then, ejecting an elongate bead forming continuous stream of molten modeling material to meld with a previously deposited elongate bead(s) to generate vectors of modeling material in any and all directions required to produce a layer of the model by vector plotting, at least when forming at least a desired outer surface defining wall of the model, thereby forming said outer surface defining wall with a desired surface finish.

The present invention further relates to a 3-D model maker for producing a 3-D model by sequentially forming layer upon layer, by plotting vectors of modeling material, one layer at a time comprising the following elements. A support means defining a surface for supporting the 3-D model during production. A drop on demand jet means for ejecting discrete bead producing drops of molten modeling material one drop at a time upon demand to meld with previously deposited beads, thereby to plot vectors of modeling material defining the layers. Mounting means mounting the jet means i) for simultaneous movement along at least two axes of an X, Y, Z axis coordinate system relative to said surface to move the jet means along any desired vector direction while said jet means plots said vectors of modeling material on said surface and ii) for movement of the jet means, when desired, along all three of the X, Y, Z axes of the system, relative to said surface. Finally, control means i) for providing vector plotting control of movement of the mounting means to move the jet means simultaneously along the at least two axes of the X, Y, Z axis coordinate system, and ii) for controlling the timing of the ejection of bead producing drops of molten modeling material by the jet means to overlap previously deposited beads to a desired extent and to meld with previously deposited beads to generate vectors of modeling material, defined by the beads, in any and all directions required to produce, layer by layer by vector plotting, at least a desired outer surface defining wall of the model with a desired surface quality.

The present invention also relates to a 3-D model maker for producing a 3-D model by sequentially forming layer upon layer, by plotting vectors of modeling material, one layer at a time comprising the following elements. A support means defining a surface for supporting the 3-D model during production. A continuous stream jet means for ejecting an elongate bead producing continuous stream of molten modeling material to meld with previously deposited beads, thereby to plot vectors of modeling material defining the layers. Mounting means mounting the jet means i) for simultaneous movement along at least two axes of an X, Y, Z axis coordinate system relative to said surface to move the jet means along any desired vector direction while said jet means plots said vectors of modeling material on said surface and ii) for movement of the jet means, when desired, along all three of the X, Y, Z axes of the system, relative to said surface. Control means i) for providing vector plotting control of movement of the mounting means to move the jet means simultaneously along the at least two axes of the X, Y, Z axis coordinate system, and ii) for controlling the volumetric rate of ejection of the bead producing stream of molten modeling material by the jet means to generate vectors of modeling material, defined by the beads, in any and all directions required to produce, layer by layer by vector plotting, at least a portion of at least the outer surface defining walls of the model with a substantially continuous thickness and thereby provide walls with a desired surface quality.

BRIEF DESCRIPTION OF THE DRAWINGS

The invention will now be described in the following detailed description, by way of example, with reference to the accompanying drawings, in which:

FIG. 16 shows the burrs formed without a support wall, FIG. 17 shows the burrs formed with a support wall, and FIG. 18 shows the final burr free model after removal of the support wall;

DETAILED DESCRIPTION OF THE INVENTION

The Model Maker Apparatus

Figure 1:
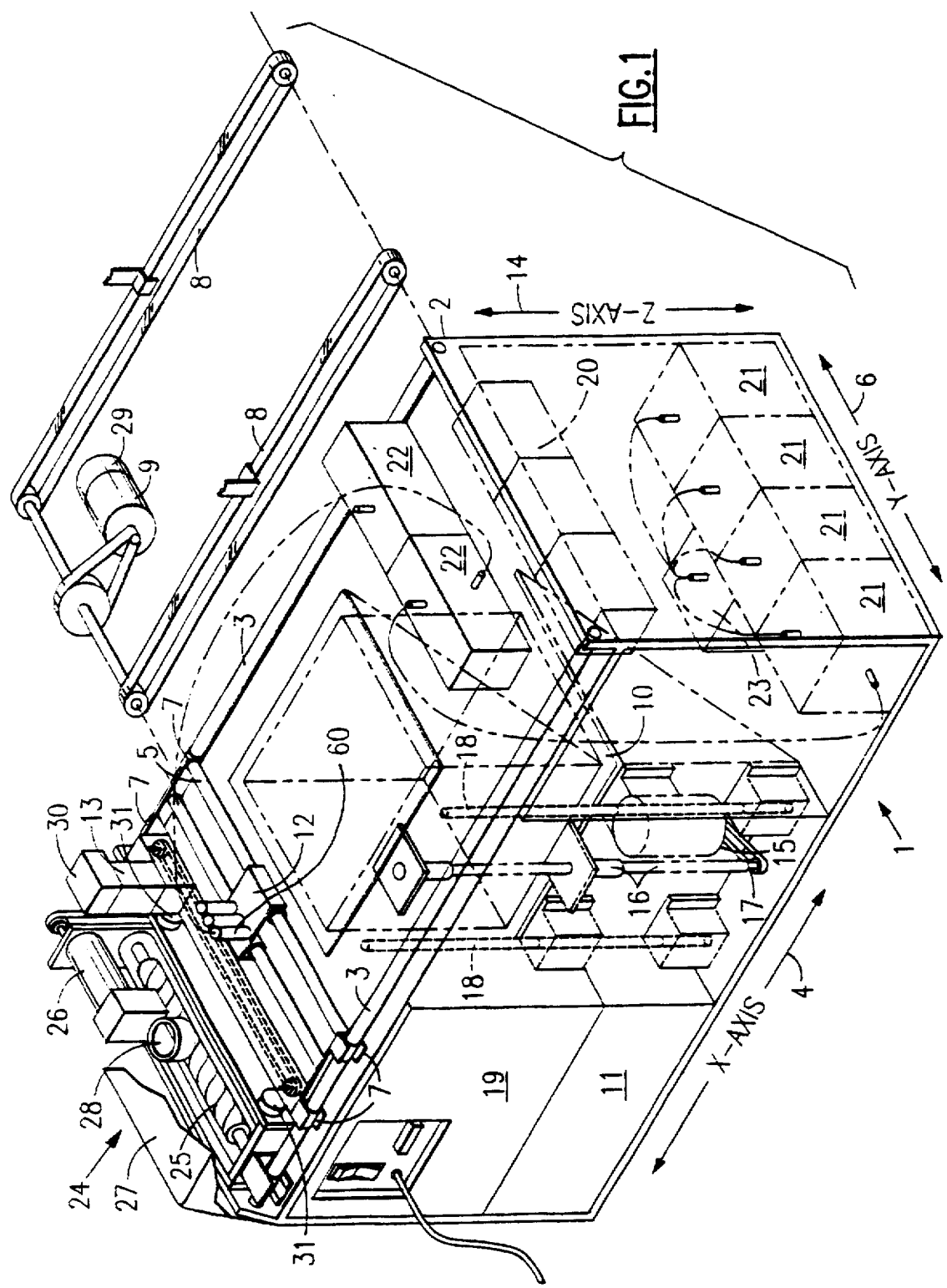
FIG. 1 is a partially exploded perspective view of a 3-D model maker according to the invention.

Referring firstly to FIG. 1, the 3-D Model Maker 1 of the present invention comprises a frame 2 which supports a horizontal pair of spaced apart rails 3 extending in an X-coordinate direction (axis) 4 of the Model Maker. The rails 3 support a further pair of horizontal spaced apart rails 5 which extend in a Y-coordinate direction (axis) 6. The Y coordinate rails 5 are supported at their ends in bearings 7 on the X-coordinate rails 3 to permit the Y-coordinate rails 5 to slide along the X coordinate rails 3 in the X-coordinate direction. Motion of the Y-coordinate rails along the X-coordinate rails is achieved by the use of a belt drive 8 (shown displaced from the apparatus for clarity) powered by a motor 9 which includes an optical encoder 29 to ascertain and determine the position of the Y-coordinate rails relative to a platform 10 (shown carrying a cubic model) along the X-coordinate under the control of a system logic controller 11.

The Y-coordinate rails 5 support a carriage 12 for sliding movement therealong under the control of a belt driven motor system 13 with optical encoder 30 similar to that described above with respect to motion of the Y-coordinate rails. This system 13 is also controlled by the system logic controller 11 to ascertain and determine the position of the carriage relative to the platform 10, but in this case, in the Y-coordinate direction.

The carriage 12 carries three jets 60. One of the jets 60 is for ejecting drops of wall producing material (modeling compound-MC), a second is for ejecting of drops of a bulk fill material (also MC) and a third is for ejecting beads of a support material (SM). These materials are hereinafter described in greater detail.

The platform 10 can be raised and lowered relative to the carriage 12 in the Z-coordinate direction (axis) 14 by means of a stepper motor 15 which drives a screw and nut jack 16, the nut of which is attached to the platform 10 to raise or lower the platform upon rotation of the screw by a belt drive 17 from the stepper motor 15. The platform 10 is guided by bearings on guide posts 18 which extend in the Z-coordinate direction. The guide posts 18 are supported rigidly by the frame 2.

The system logic controller 11 determines the position of the platform relative to the jets 60 in the Z-coordinate direction and the timing of ejection of the bead producing drops of material from the jets 60 using software instructions not unlike those utilized in vector plotters to control the motion of the vector plotter pens in the production of the drawing as will be well understood by those skilled in the art.

The frame 2 supports a power supply 19 which provides the power for the various systems and motors of the model maker in accordance with their individual requirements and the commands issued by the system logic controller 11. Adjacent one end of the X-coordinate rails 3 is a jet checking and cleaning station 20 which will be described in greater detail hereinafter. At that same end of the X-coordinate rails the frame 2 supports heated supply reservoirs 21 which store MC, bulk MC and SC, as required, for supply to the jets 60, by way of feed reservoirs 22. A pressure pump 23 is supported by the frame 2 to pressurize the supply reservoirs 21 when the media carried therein is required to be transported to the feed reservoirs 22.

The X-coordinate rails 3 also support a model shaving system 24 the use of which will be described in detail hereinafter. The model shaving system 24 comprises a slab milling cutter 25 which is belt driven by a motor 26 and includes a housing 27 for connection to a vacuum line by way of an outlet 28 to facilitate removal of shavings produced by the model shaving system. The model shaving system includes electromagnets 31 for engaging the carriage 12 Y coordinate system 5 for moving the milling cutter along the X-coordinate rails. The milling cutter 25 defines an axis extending in the Y-coordinate direction and has a length at least as great as the dimension of the platform 10 in the Y-coordinate direction.

It will be appreciated that a plurality of jet groups could readily be accommodated on a single carriage, with means for adjusting their spacing if required, associated with a common X, Y and Z drive arrangement, shaving system, controller, power supply etc. in a single model maker, to permit the simultaneous modeling of a plurality of like models, hereinafter described in greater detail.

It will be appreciated that while model maker 1 described with reference to FIG. 1 provides vector movement of the jets 60 in the X-Y coordinate direction and movement of the platform 10 in the Z coordinate direction, other arrangements would be apparent to those skilled in the art. In fact, the X, Y, Z coordinate movements may be provided by moving either the jets 60 alone or the platform 10 alone or by any combination of movements of the jets and platform resulting in the desired coordinate movements. Furthermore, although the Z coordinate direction is preferably vertical, those skilled in the art will appreciate that other orientations for the Z coordinate direction (axis) are possible.

It will be appreciated that while the system logic controller has been described in a manner suggesting it to be a single unit, a plurality of separate control units interacting as needed could together form the system logic controller.

The MC and the SC are very different compounds. Their most important characteristic is that they both phase change at similar temperatures, but respond to completely different solvents. The solvent that is used to remove the SC has no effect on the MC and vice versa. This creates a very convenient handling environment, plus the solvents used are very common and environmentally safe.

Other differences in the modeling materials are in their density and surface tension. Because of these differences the functional fluid level of each material is different. Basically the MC (sulfonamide based material) fluid level in the feed reservoir is about 25 mm above the fluid level in the jet head reservoir. The fluid level in the SC (wax base material) feed reservoir is about 25 mm below the fluid level in the jet head reservoir.

Modeling and Support Compound

Turning now to the media, the wall and fill material are, at the present time, preferred to be one and the same, namely either.

| Formula 1. | Parts by weight |
|---|---|
| a) Ketjenflex 9S | 90 |
| b) Vitel 5833 | 10 |
| c) Ultranox 626 | 1 |
| or | |
| Formula 2. | Parts by weight |
| a) Ketjenflex 9S | 85 |
| b) Vitel 5833 | 10 |
| d) Iconol NP-100 | 5 |
| c) Ultranox 626 | 1 | where:
a) Ketjenflex 9S is 40/60 Blend ortho-Toluene Sulfonamide/para-Toluene Sulfonamide available from Akso Chemie—Chicago, Ill.
b) Vitel 5833 is Polyester resin available from Shell Chemical Company—Akron, Ohio
c) Ultronox 626 is Phosphite antioxidant available from G.E. Specialty Chemicals Inc.—Parkersburg, W.V.
d) Iconol NP-100 is Nonylphenol Ethoxylate available from BASF Performance Chemicals—Parsippany, N.J.

The Support media is preferably:

| | Parts by weight |
|---|---|
| a) Candelilla Wax Refined, light flakes | 65 |
| b) CPH-380-N | 20 |
| c) Ross Wax 100 | 10 |
| d) Eastotac - H 130 or H 100 | 5 |
| e) Irganox 1010 | 2 | where:
a) Candelilla Wax is low resin natural wax available from Frank B. Ross Co., Inc.—Jersey City, N.J.
b) CPH-380-N is N,2-Hydroxyethyl Stearamide available from The C.P. Hall Company—Chicago, Ill.
c) Ross Wax 100 is Fischer-Tropsch Wax available from Frank B. Ross Co., Inc.—Jersey City, N.J.
d) Eastotac is H 130 or H 100—Hydrocarbon resin available from Eastman Chemical Products, Inc.—Kingsport, Tenn.
e) Irganox 1010 is Hindered phenol antioxidant available from Ciba-Geigy Additives—Hawthorne, N.Y.

It is important that the above materials have the proper amount of self adhesion as well as adhesion between the build material and support material. The adhesion property is very important in minimizing problems of warpage and proper strength of the finished model. In addition the two materials must have the right properties for proper cutting during the cuts for Z dimension control. These properties are:

1. Materials must be hard enough to cut with slab miller without blade contamination.

2. Materials must have matched crystallization rates.
3. Materials must have similar melting points and thermal coefficients of expansion.
4. Materials must not be soluble in each other and further each must be capable of being dissolved in a solvent which the other material is insoluble and vice versa.

Model Building

Using the model maker 1 a three dimensional model is produced using a thermoset drop on demand ejector (jet 60) at a desired "drop pitch" to produce a vector outline of the inside and outside surfaces of a given layer. Preferably, said vector outline is repeated one or more times by off setting subsequent vectors from desired outlines depending on part geometry and build strategy (solid model or shell model). The amount of offset is referred to as "wall pitch". These parameters can be varied to produce a high quality surface 3-D model. Both wall pitch and drop pitch can also be varied to produce a layer thickness range of from about 0.03 mm to about 0.18 mm which will result in an operator selectable surface finish/build time trade off. Wall pitch control is achieved via software as implemented by the controller 11. Head to tail vector plotting is an additional software control that is used to enhance surface quality.

The model is then produced one horizontal layer at a time using X-Y vector plotting techniques, for at least the exterior surface defining walls of the model, using drop on demand jets with bead pitch control. The bead pitch is controlled by varying the rate of emission of bead producing drops of MC from the jet in response to the velocity, acceleration, and change in direction of the jet, such that walls having a substantially constant width and a desired surface quality are formed. Z coordinate model control is discussed hereinafter under "Layer Growth Control".

Head to tail vector plotting with constant clockwise or counter-clockwise orientation provides uniform cooling, reduced positional error, and therefore a smoother surface finish.

Filling Interior Spaces of the Model

The jet heads 60 preferably have a structure that is capable of operating under control at a maximum constant refire rate, for example, 6,000 Htz. The same size bead of MC is consistently emitted from the jet up to this maximum constant refire rate. If the refire rate is increased to a frequency at which the jet resonates, for example, 12,000 Htz, the jet emits beads of MC which are approximately twice as large as the beads emitted at maximum constant refire rate. Thus, at the resonant refire rate, the jet emits several times the volume of MC the maximum control refire rate, e.g. 2 times the number of beads that are approximately 2 times as big, thereby building the model several times as fast. Thus, at the resonant refire rate, the model can be built up much faster than at the maximum control refire rate, although due to the increased size of the beads and a decrease in consistency in bead size of MC being deposited, there is a corresponding decrease in the surface quality of the model produced.

Figure 2:
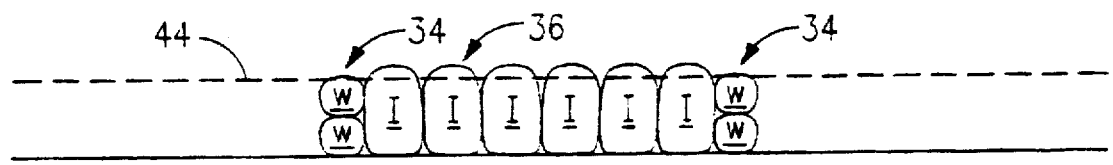
FIG. 2 is a diagrammatic illustration of a resonant quick fill method for filling interior portions of a model.

Operating the jet head at a non-resonant refire rate, at which consistently sized beads W of MC are ejected from the jet, may be advantageously used to form exposed inner and outer walls 34 of the model having a desired surface finish. While interior portions 36 of the model, which will not be exposed in the completed model and therefore do not require a good surface finish, may advantageously be filled by operating the jet 60 resonantly to eject large beads I of MC from the jet 60, as illustrated in FIG. 2. This technique reduces build time by approximately 50 percent or more, while maintaining high surface quality by building outer surface defining walls via vector plotting at a controlled refire rate.

As discussed above, when ejecting beads of MC from the jet head at the resonant frequency of the jet head, the beads I of MC ejected by the jet head may be twice as large as the beads W ejected at a non-resonant refire rate used for forming beads of uniform size. Therefore, it can be appreciated that approximately only one layer of beads I fired at the resonant frequency is required for every two layers of beads W fired at the maximum controlled refire rate, as illustrated in FIG. 2. The beads I formed at the resonant frequency are not exactly twice the diameter of beads W fired at the maximum control non-resonant frequency. Therefore, it is desirable to mill along machine line 37 after filling every two layers of beads W with a single layer of beads I to provide constant layer growth.

The model may be built using two heads. One head for emitting modeling material for building of the walls at the non-resonant controlled frequency and for quickly filling in voids in the model at resonance, and a second head for emitting support material at the control frequency to fill in voids in the model or to support overhanging portions of the model. It can also be appreciated that rather than firing the first head at resonance, a third head with a larger orifice may be used to emit larger beads of modeling material or support material and thereby fill in interior spaces quickly without necessitating a resonant refire rate, or to fill in even more quickly using resonant operations. Interior portions of the model may be filled via plotting techniques that are faster than vector plotting, such as raster scanning and raster-like scanning techniques, to further saving on build time.

Fill Material

While void filling has been discussed using large beads I of MC ejected from a resonating jet 60 or from a dedicated larger orifice jet, other filling systems are contemplated. For example, voids could be filled by quick set foams (e.g. urethane) or other quick setting and/or quick application materials (e.g. waxes, powders, UV setting liquids etc.)

Figure 8:
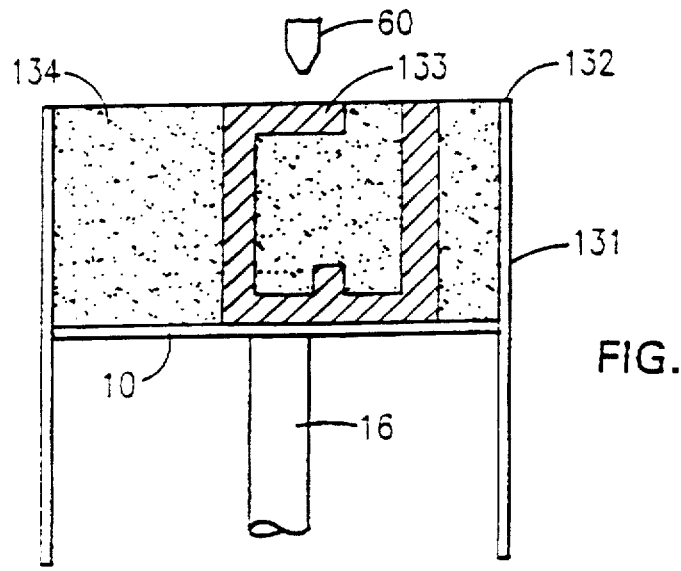
FIG. 8 is a diagrammatic illustration of a powder fill method for quickly filling interior portions of a model.

In an additional method of filling voids, at the completion of every so many layers and preferably before cutting, round beads or small particles at ambient temperature maybe added to fill the void to the top of the last build layer. These particles can be of the build material (MC) or could be of any other compatible material. Rather than beads, a fine powder may be used to fill the void, as illustrated in FIG. 8.

After filling, at least the upper surface of these particles are glued or welded together by jetting beads from either the build material jet or the support material jet. After cutting, the model building proceeds as before.

Honey-Comb Quick Form and Fill

Figure 3:
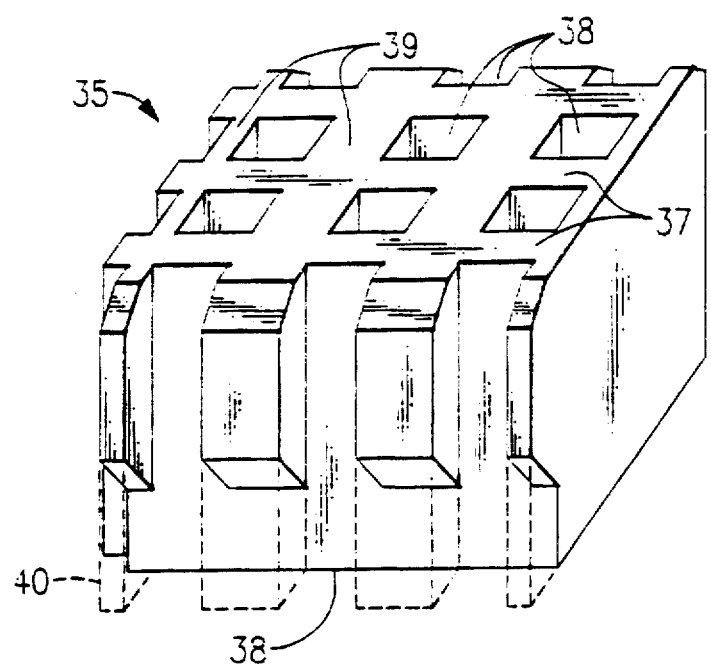
FIGS. 3 and 4 are diagrammatic perspective and plan views, respectively, of an "egg-crate" lattice structure.
Figures 4, 5:
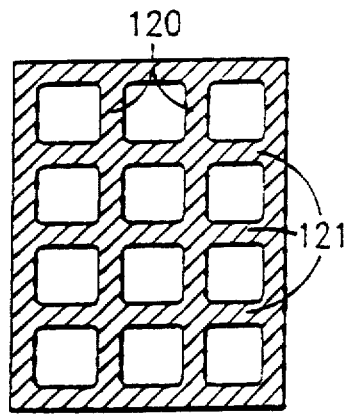
FIGS. 5 through 7 illustrate various lattice reinforcements for use with hollow models.

When final surface quality of the model is not a critical factor, such as when producing a concept or prototype model 35, open skeletal prototype models, as illustrated in FIGS. 3 and 4, may be built in order to test fit, form and/or function of the produced model. The entire skeletal prototype model 35 may be built using a common grid or lattice structure 37 without any enclosing perimeter walls.

The lattice structure 37, as illustrated in top view in FIG. 4, is formed by two sets of orthogonal parallel walls 37 and 39 that intersect to form a plurality of vertical column-like elongate square spaces 38 therebetween. The resulting model 35 consists of an egg carton structure or honeycomb lattice 36 structure with no enclosing outer or inner skin (except where a wall coincides with the outer extent of portions of the model) and no enclosing upper or lower surface close-offs, such that the spaces 38 are open on the external surfaces of the model, forming an open skeletal structure. It can be appreciated that any number of walls, intersecting at any desired angle(s), may be used to form any desired lattice structure, such as an octagonal honeycomb structure, for example.

A common lattice structure 36 is preferably used for building both the model 35 with MC and building support sections 40 with SC. The support sections 40 are illustrated in ghost in FIG. 3. By using a common lattice structure 36 for both the support sections 40 and the model 35, it is not necessary to close off the upper surfaces of the support sections 40 before deposition of MC on top of the support sections 40.

The above technique provides for advantageous high-speed production of a concept or prototype model 35. The open structure of the model increases surface area and allows for air flow in and out of the model, providing for quick and efficient cooling of the MC forming the model and of the SC forming the support sections. The quick cooling of the MC and SC enables faster deposition of MC and SC. Moreover, elimination of the need to form outer surface defining perimeter walls closing off the model further saves build time. The common grid structure of the model and the support material may be built via plotting techniques that are faster than vector plotting, such as raster-like scanning techniques, further saving on build time.

The above grid structure model build technique may be advantageously used to form a model 35 for use in producing "near net shape" castings. "Near net shape" meaning a casting that only requires a minimal amount of machining or finishing to achieve the desired final shape and/or surface quality. The head of a golf club, for example, may be produced via a near net shape casting process, because only a portion of the casting, in particular the impact surface of the club, requires a subsequent finishing step to achieve the desired surface quality.

To produce a model 35 for near net shape casting, a skeletal model structure 35 is first fabricated out of MC using the above common grid, egg-shell lattice structure 35. The inner and outer skin of the model 35 is then formed, if desired, by dipping, brushing, coating, or spraying the model 35 with a sealing wax or other suitable material. The sealing wax serves to seal, enclose and/or fill the open spaces 38 in the lattice structure 35 that are exposed on the outer surfaces of the model 35.

The near net shape model 35 may then be used to form a wax mold for investment casting of a near net shaped casting, which is then machined by any conventional machining process to the desired final shape and/or surface finish using cast datum surfaces per conventional computer numerical control or other machining process. Machining datum surfaces may be added to the data file to create datum surfaces on the near net shape model 35 to provide a convenient, accurate means for controlling subsequent machining and casting operations.

The need for a subsequent finishing step may be eliminated by enclosing desired portions of the near net shape model, corresponding to the portions of the final product having a desired surface finish, the striking surface of a golf club, for example, with outer surface defining walls having a desired surface finish, via vector plotting as previously described. If multiple castings are desired, a plurality of wax molds may be formed out of the coated near net shape model 25. Moreover, a plurality of near net shape models 35 may themselves be formed as investment casting molds for casting engineering resins, i.e. urethanes, or may be used to make a plurality of silicone rubber or other molds for investment casting engineering resins.

Layer Growth Control

Z axis control is important in controlling part geometry. With drop volume and thickness variations from machine to machine, presently, the only practical method of controlling the Z axis is to mill the model at selected intervals. Within a given layer, geometric variations such as at intersections, and wall thickness variations contribute to creating a varying layer thickness. Although this may only amount to thousandths of a millimeter per layer, it soon accumulates. Slab milling the top surface after selected intervals, for example, along machining line 41 in FIG. 2, guarantees that the vertical growth is under as accurate dimensional control as the X and Y axis.

Additionally, slab milling the top layer at selected intervals helps to relieve intra-layer stresses. Accumulated dot shrinkage is responsible for adding to the warpage control problems that will be discussed later. Milling these layers unbalances the stresses so that the stresses remaining actually work oppositely and cause those layers to tend to warp in the other direction. However, with the firm foundation that the layers are being built on these stresses do not cause problems. To maintain a precise Z-AXIS build, the model shaving system 24 is utilized after one or more layers (preferably five) of modeling compound have been laid down. When the controller 11 senses a "cut command" the rails 5 and carriage 12 assembly move to engage and "pick up" the shaving system via two electromagnets 31 and translate the milling cutter 25 across the model at software selectable cutting speed and feed, return the shaving system 24 to its home position, release the engagement and continue building the model. The milling cutter is coated with Polyond to facilitate release of shavings from the model for removal by sub-atmospheric pressure connected to output 28.

Figure 16:
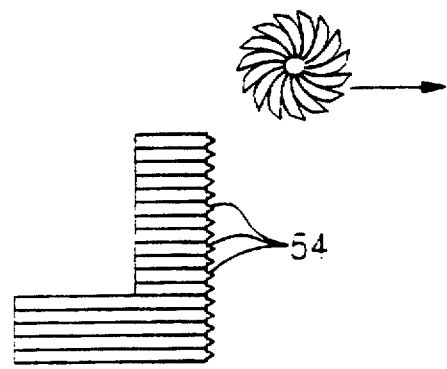
FIGS. 16–18 diagrammatically illustrate a method of preventing burr formation and de-lamination of the model during milling by providing an outer support wall around the model.

The stresses created in the walls of the model by the mill cutter during machining may cause the walls of the model to de-laminate, fray and/or chip. In order to minimize the stress created in the wall during machining, a coarse cut that removes most of the material to be removed during milling and removes any high spots, is followed by a fine cut that removes less than 0.01 mm (0.0004 inches) of material during a return pass of the cutter. The resulting stresses created in the model during the coarse and fine cuts is less than the stresses created during a single heavy cut. Moreover, the burrs created during the fine cut are smaller than those created during a single heavy cut, as illustrated in FIG. 16, or during the coarse cut. Thus the fine cut removes the relatively larger burrs created during the coarse cut, resulting in an improved surface quality. The fine cut is preferably a climb cut to further minimize stress and burr formation and maximize surface quality. A climb cut is a milling cut in which the milling teeth descend onto the material to be removed.

During milling, a vacuum provided at outlet 28 evacuates the particles of MC and SC removed from the model by the mill cutter. The vacuum action further serves to cool the layer being cut, and to cool the cutter blade as well for the fine cut during the return pass. The cooling effect on the cutter allows relatively soft, low melting point modeling, fill and support materials to be cut into fine chips and evacuated without gumming the cutter blade.

Alternating Drop Warpage Control

Warpage is the single most difficult problem to overcome in producing high accuracy parts. The fundamental properties of the present system would support a severe warpage control problem. The basic material used to produce parts have themselves high shrink rates (18% to 22%) when compared to other materials. When a material has a different specific gravity in one form versus another, such as liquid form versus solid, there will be noticeable shrinkage during phase changes. The present invention must deal with this problem, as well as with the physical coefficient of thermal expansion that all solids have. When the parts are formed hot and are used cold, there is always a problem with warpage.

To overcome the problems of shrinkage caused warpage. The special benefits of the previously described process may be utilized. The previously described conditions affecting the materials would apply if a part were cast from molten material in a mold. However, the present invention forms parts a single drop (bead) at a time. In doing so, most of the material shrinkage occurs while the drop is enroute and as soon as the drop hits the building surface. Before the next liquid drop hits the surface and has a chance to completely flow into the previous drop it begins to shrink.

Controlling part geometry, material temperature, bead pitch, flight distance/time, wall pitch and building surface temperature together with layer milling can control the shrinkage to where it has minimum effect on the part to cause warpage. To achieve this, material temperature, flight distance/time, and building surface temperature become standard machine settings, while dot pitch, wall pitch, and layer milling are operational variables. Controlling these variables allows maximum influence on warpage and dimensional control.

Beyond all of these factors is still the problem of individual drop shrinkage. Therefore, a major objective, regardless of the approach, is to control drop shrinkage. There must be enough fluidity left in the drop to assure coherence to the previous build, but not enough to cause warpage.

Cross Hatching Pattern Fill & Warpage Control

It is practically impossible to totally eliminate all shrinkage and warpage during building, but it is possible to control it within allowable tolerances. When warpage is still a problem, imaginative fill patterns begin to play an important role. Double crosshatching hi-axially reinforces the section of the model to help eliminate anisotropic shrinkage. Uniformity in fill patterns enhances dimensional and shrinkage control. With fill wall pitch it is important to obtain maximum reinforcement with the least amount of material to keep up with the perimeter build. In some cases it may be necessary to alter the perimeter conditions in order to match the fill pattern build rate.

Typically, bead pitch is a settable parameter. In one shrinkage reduction technique, a drop is placed at a specific first bead location. Where the second drop would normally be placed there is a space. A second drop is then placed where the third bead belongs. This pattern is repeated for the complete layer. When the layer is completed with half of the required beads a single drop pitch shift occurs. The layer is then repeated. As a result, the drops of this repeated layer are placed in the spaces between the previous beads. Completing this shifted pattern completes the layer. This may be repeated throughout the part, or perhaps only where warpage or dimensional control is anticipated to be a problem. The advantage is that each drop has the opportunity to fully shrink without the influence of the other drops of that layer. The result is that now the vast majority of the shrinkage has already occurred and the object is effectively being built with preshrunk material. Minimized stresses which result have little or no effect on the layers.

Lattice Support Structures Fill & Warpage Control

Important to the successful building of some hollow shell models are internal support patterns or lattices. These patterns allow building models with less then 100% density. Basically they consist of walls of varying thicknesses and pitches running either unidirectional or bi-directionally. Orientation of the patterns should be carefully considered to ensure minimum warpage.

In some modes, their shape may pose warpage problems when using unidirectional patterns. This additional warpage comes as a result of polarizing stresses in one direction. In these cases, changing the support pattern orientation may decrease the warpage problems by re-distributing the stresses. In any case, the unidirectional pattern chosen continues throughout the part.

Bi-directional lattices consist of bi-directional walls in the same layer. This is particularly helpful with smaller aspect ratios that require the same reinforcement in all directions. In cases of larger aspect ratios there may be reasons to vary the pattern pitch from one direction to the other to further increase the control of warpage.

Basically, the major reasons for lattice patterns are: 1. Density reduction. This has several direct benefits. First there is the obvious benefit of less material and therefore less expense. Second, there is reduced time required to build the model. With 40% less material a comparable solid model will take considerably more time to build. 2. Warpage control. While warpage is a relatively minor problem, the fill pattern options further reduce it to the point where secondary solutions such as annealing and fixturing should account for only single digit percentage of applications. 3. Reduction of strain of a wax pattern on the ceramic cavity during processing in an investment casting operation. 4. Model cooling is quicker.

There are several factors to consider when determining the type of lattice pattern for a model. 1. What is the minimum amount of material required for the model? Sometimes the model may have to be solid. 2. What is the anticipated warpage? 3. What is the desired outside wall finish? This must be considered in those cases where the wall type selections cause accelerated build rates. These cases require matching the build rates of the exterior walls with those of the lattice walls. 4. Is the part going to be closed off? Depending on the height of the part, this will determine the pattern pitch. The shallower the part, the closer the pattern pitch has to be.

Structure lattice reinforcing arrangements such as have been described above are exemplified by FIGS. 3–8. The lattice structure of FIGS. 3 and 4 may be used as reinforcing walls 120 interconnecting a pair of opposite outer walls. FIG. 5 illustrates a variation of FIG. 3 and 4 in which the bi-directional reinforcing walls terminate in an inner wall 122 of the model which is formed in each layer after the corresponding outer wall of that layer has been formed. By this arrangement undesirable stresses in the outer wall of the model, surface discontinuity or warpage thereof can be reduced or eliminated. Alternatively, one or more outer walls may be filled with a lattice fill structure with a gap of approximately half of the outer wall width between the lattice fill structure and the outer wall. After shrinkage of the lattice fill structure, the fill structure is extend, filling the gap and joining the fill structure with the outer walls.

Figures 6, 7:
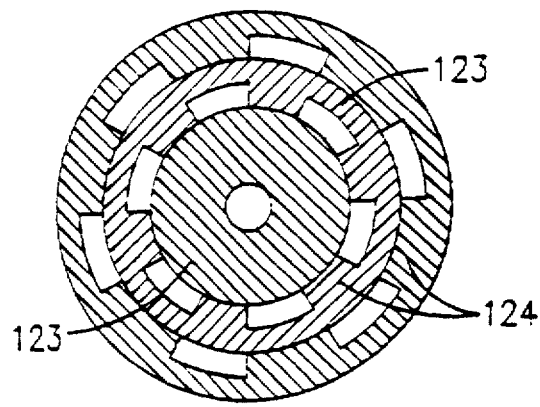

FIG. 6 is a horizontal cross-section of a right cylindrical tower model with concentric inner reinforcing walls 123 spaced by ribs 124 to form a unitary structure. FIG. 7 illustrates a method of closing the top of a square tower model, such as illustrated in FIGS. 3 and 5, in which the top 125 of the tower is to be closed. In this arrangement when the model layers approach the closed top, drops are ejected over the entire area of the tower with the result that some of these drops form beads broadening the top of the reinforcing walls and some of the drops fall between the reinforcing walls to form beads at the bottom of the tower as shown as 126. As the layers are formed progressively toward the closed top, the width of the walls increases as additional beads are formed thereon until the space between the reinforcing walls is closed as shown in FIG. 7. The solid top can then be completed. The interior of the model may also be quickly filled with a particulate or powder material as illustrated in FIG. 8.

Figure 9:
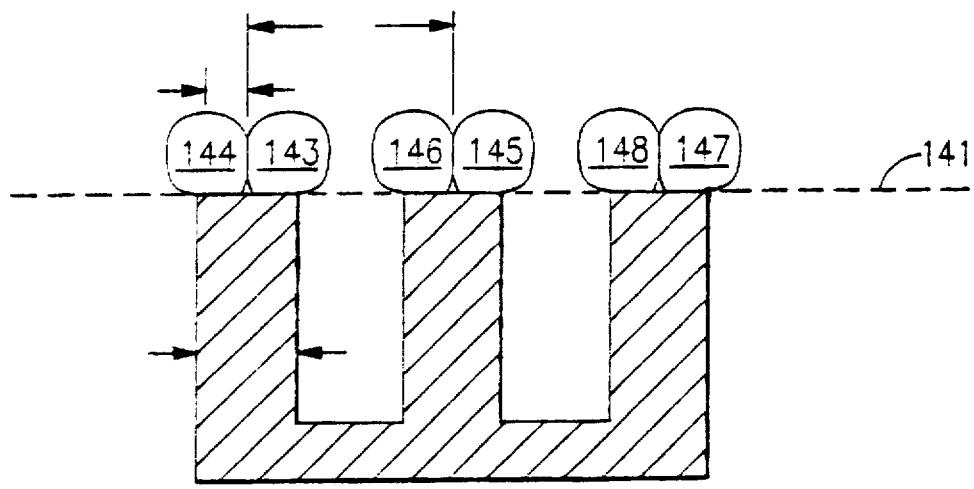
FIGS. 9 and 10 are diagrammatic illustrations of a single layer close off method, for closing off the top of a hollow model.
Figure 10:
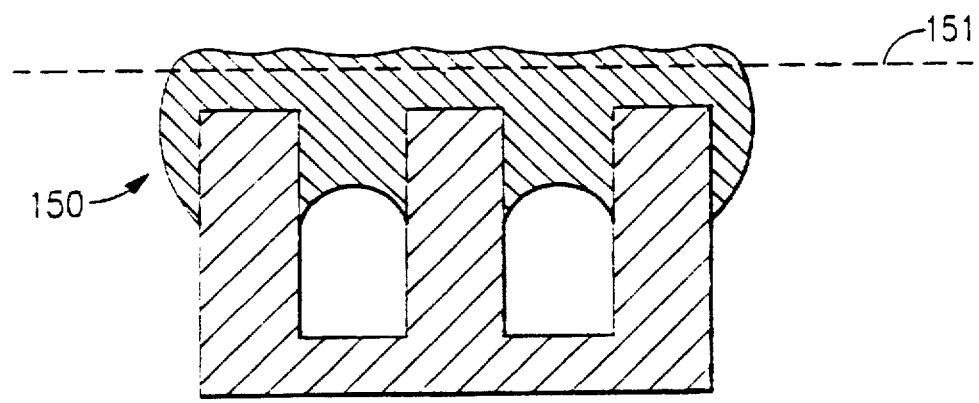

FIG. 9 illustrates an alternative method of closing the top of a square tower model, such as illustrated in FIGS. 3 and 5, with a single layer of modeling material. In this arrangement, when the model layers reach the desired closed top of the model, the last deposited layer is machined along plane 141 prior to closing of the top of the model. Beads 143, 145, and 147 of molten modeling material are ejected in a first jog pattern during a first pass and beads 144, 146 and 148 are depositing in a second jog pattern, offset from the first jog pattern, in a second pass, as illustrated in FIG. 9. The beads of molten modeling material 143–148 flow down the sides of the walls and, due to capillary action, surface cohesion and surface tension, contact and meld with adjacent beads, closing off the top of the model with a single layer 151 of modeling material, as illustrated in FIG. 10. After deposition of the single, the layer 151 is machined along plane 151.

Since no drops fall between the reinforcing wall, the modeling material is more efficiently used when closing the top of the model of with a single layer, than when closing the top of the model with a plurality of layers as previously described. It can be appreciated that the single layer close off will only work when the reinforcing wall pitch, i.e. spacing between the reinforcing walls, is small enough that adjoining drops contact and meld with one another. Resonant firing of the jet head, may be used to fire larger drops of modeling material when closing off the top of a model and thereby increase the reinforcing wall pitch capability of the single layer close off method.

Building and Supporting Inclined Walls

Figure 11:
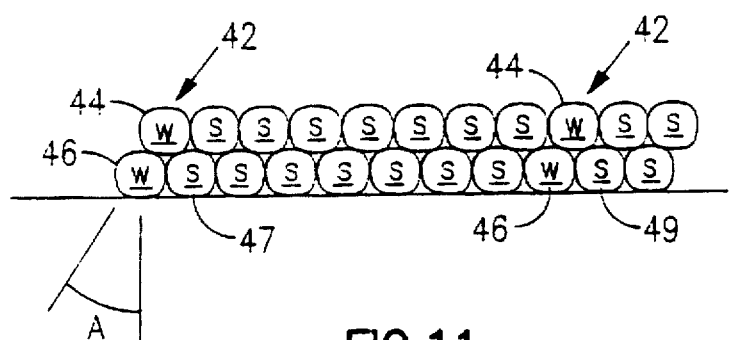
FIG. 11 is a diagrammatic illustration of a method for supporting inclined wall structures.

When the interlayer build angle, angle A in FIG. 11, in a wall 42 being formed exceeds a critical angle, for example, approximately 30 degrees from vertical, if the next deposited bead 44 is not supported, it will slide or roll off of the previously deposited bead 46 under its own weight, resulting in a collapse of the desired inclined wall structure 42. Thus, when the inter layer build angle A exceeds the critical angle, support beads S, the size of a single layer, must be deposited adjacent the previously deposited wall forming beads 46, in particular, see support beads S 47 and 49 as illustrated in FIG. 11, before the deposition of the next layer of beads 44 of MC. Thus, when the build angle A exceeds the critical angle, the fill must be performed with a single layer fill technique, rather than with the time saving double layer resonant fill technique described above.

Figure 12:
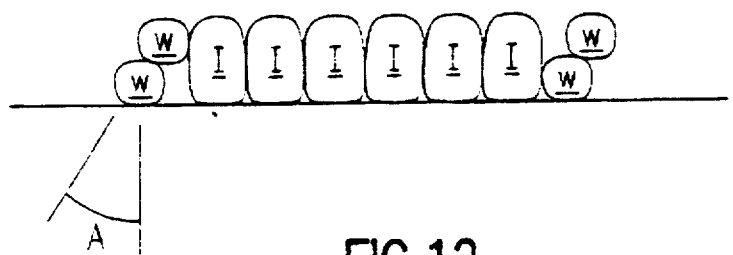
FIG. 12 is a diagrammatic illustration of a resonant quick fill method for use with an inclined wall structure.
Figure 13:
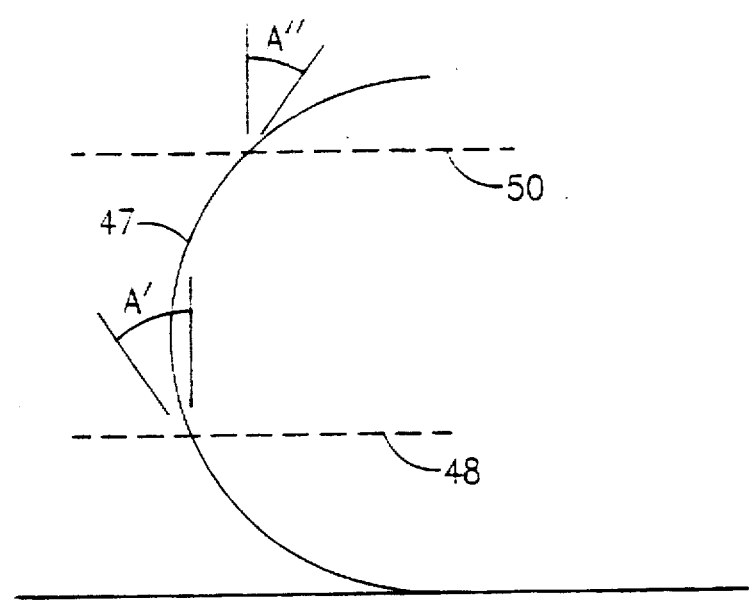
FIG. 13 is a diagrammatic illustration of how the methods of FIGS. 9 and 10 maybe used together.

The double layer resonant fill technique can still be used, however, to quickly fill interior portions of the model where the interlayer build angle A is less than the critical angle, as diagrammatically illustrated in FIG. 12. In FIG. 13 the build angles A' and A", located at levels 48 and 50, respectively, on wall 51 are equal to the critical angle. Thus, the portion of wall 51 between lines 48 and 50 is formed with interlayer build angles that are less than the critical angle. Therefore, the portion of the model between lines 48 and 50 may be quickly filled using a desired quick fill method, for example, resonant fill, or continuous stream fill or spray fill with U.V. curable material, etc. as subsequently disclosed in detail. Whereas, the portions of the wall 51 below line 48 and above line 50 are formed with interlayer build angles that are greater than the critical angle, therefore these portions of wall 51 will collapse if not supported by support beads S.

It will be appreciated that, depending on the geometry of the jet head, the beads fired at resonance may be N times as large as beads fired at the maximum control frequency. In which case, interior portions of the model will be filled by depositing a single layer of beads formed at resonance, after depositing N layers of beads defining the outer surface defining walls at the maximum control frequency.

External Surface Finish Control

The jet head traverses in a computer controlled fashion to create 3 dimensional objects as earlier described, by repetitively applying layers of MC with varying or the same cross-section until the desired shape is obtained. In this manner, walls are constructed a droplet at a time at various spacings or bead pitch.

As the jet dispenses the MC droplets they land on a substrate and form beads of a thickness about one half of their diameter after solidification. Depending upon the pitch, these drops can be deposited in an overlapping pattern. When new overlapping droplets hit the solid drops below, their momentum causes them to splatter slightly forward in the direction of printing. The resulting formation is similar to that which would be achieved by laying soft disks in a line with the disks overlapping each other. The degree of overlap can be 75% or more, with each bead overlapping the previous one and melding with the beads of the layer below. After a significant number of layers have been laid down a roping or serpentine pattern can be detected in the wall when viewed from the side. The roping pattern may be undesirable in some applications and can be significantly diminished or totally eliminated by the addition of an immediately adjacent inner wall or walls. The actual number of walls will be determined by other factors (such as vertical build rate) in addition to the required finish. The wall thickness (or wall pitch) can be set to whatever is required.

In single pitch walls, meaning a wall consisting of a single drop allowing the fluid droplet to wet the top of an interior wall when it splatters. Thus, the droplet wets inwardly as well as in the direction of building, reducing the volume of MC available for the roping pattern. The net result is a smoother exterior wall.

Interior lattice or fill patterns have a visible influence on exterior wall finish due to the thermal effect their ends have on the thin wall. With multiple thickness exterior walls this mass related phenomenon is reduced. As the exterior wall is made thicker, the ratio of lattice material and wall material is shifted in favor of the wall, so that there is less lattice effect in the wall finish.

Wall intersections with lattices are determined by software algorithms so that whenever there is an intersection, the end of the lattice line is pulled back from the centerline of the wall by 50% of the lattice wall thickness. Since the lattice walls and exterior single walls are of the same construction, the result is a 50% merging of material at each intersection. When building with multiple thickness exterior walls, the lattices interact only with the inner most wall. Therefore, latticing will effect the outside finish of a single thickness exterior wall more than a multi-thickness exterior wall which masks the lattice effect on exterior finish.

Milling Every Layer To Improve Surface Quality

Figure 14:
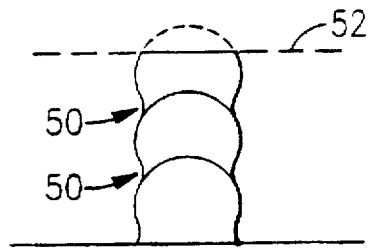
FIG. 14 diagrammatically illustrates a method of layer growth control in which the top layer is milled at preselected intervals.

The serpentine pattern described above, is a result of the formation of the walls of the model by deposition of beads of molten MC. FIG. 14 diagrammatically illustrates a single layer wall formed of a plurality of layers of beads of MC. When a bead of molten MC lands on a previously deposited bead, a small portion of the molten MC in the newly deposited bead flows onto the previously deposited bead, melding the two beads together. The surface tension in the molten MC that flows onto the previously deposited bead, creates a smoothly curved meniscus like formation, which appears as a small dimple 50 in the outer surface of the model. Since the beads of modeling material are relatively small, i.e. typically in the range of about 0.12 mm in diameter, the dimples are small and shallow enough that the surface quality is satisfactory for most purposes without any subsequent finishing steps.

Figure 15:
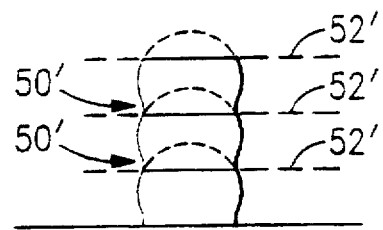
FIG. 15 diagrammatically illustrates a method of improving surface finish by milling each layer.

If a smoother surface quality is desired than is formed in the above described manner, the surface quality of the walls can be improved by milling each layer of beads (cut lines 52'), before depositing the next layer, as illustrated in FIG. 15. FIG. 14 illustrates the standard method in which, at selected intervals, the last deposited layer is milled along machining line 52, in order to control layer growth. When a layer is milled, the tops of the beads in the layer are removed, for example, by removing 25 percent of the height of the beads. Removing the tops of the beads in a layer provides a wider platform for the next layer of beads to land on. As a result, the dimples 50' formed between the newly deposited beads and the previously deposited and milled beads are shallower than the dimples formed without machining, as illustrated in FIG. 15. If every layer is milled before deposition of the next layer, as illustrated in FIG. 15, all the dimples 50' are smaller and shallower, and a wall having a smoother surface finish is formed. Machining every layer, however, as illustrated by machine lines 52' in FIG. 15, significantly increases the build time.

Outlining Support Wall for Burr Reduction

As discussed above machining each or every so many layers of the model during building, serves to control layer growth and improves surface finish. When machining layers of the model during building, however, the cutter forms burrs 54 on the outer surfaces of the model, as illustrated in FIG. 16. The burrs formed during machining decrease the surface quality of the outer surface defining walls of the model. Moreover, the stresses created in the wall during machining may also cause the outer skin, or layer of beads of material, to split away from the wall. As a result, portions of the outer surface of the model may have flaking, pealing or frayed portions that have delaminated from the surface of the model.

Figures 17, 18:
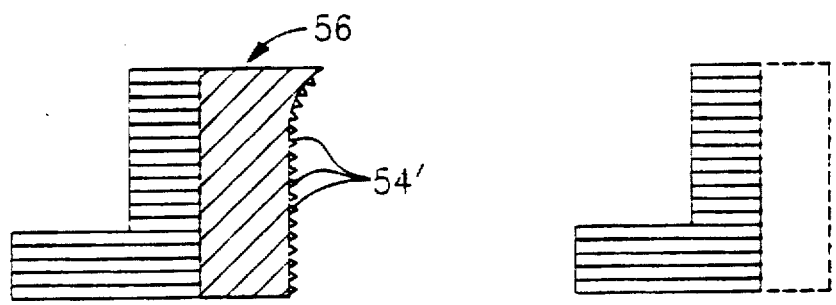

In order to substantially eliminate burr formation and de-lamination of the outer surface defining walls of the model during mill cutting, an additional support wall 56 of support material, which is removed after completion of the model, may be deposited around the outline of the model as illustrated in FIG. 17. The outer support wall serves to support the outer surface defining walls of the model during machining, such that they do not de-laminate and split under the stress during machining. Moreover, the burrs 54' formed by the mill cutter are substantially only formed on the outer surface of the support wall 56, rather than on the outer surface of the model. Thus, when the support wall 56 is removed, burrs 54' are removed along with the support wall 56, as illustrated in FIG. 18. The result is a greatly improved surface quality of the outer surface defining walls of the model.

When support walls 56 as discussed above are used in building a model, the outlining surface defining walls of the model are first deposited. The interior space of the model is then filled by the desired fill method, which fill methods are discussed in detail above. The additional outlining support wall is only formed after shrinkage of the fill material, such that the support wall adheres to the outer surface defining walls of the model to support the outer surface defining of the wall during machining.

Corner Structure

A technique for forming outside and inside corners of the model's perimeter is very similar to the merging of material mentioned earlier when discussing the lattice walls intersecting with exterior walls. When turning corners with the jet, the MC material tends to accumulate at the corner. This accumulation is due in part to the fact that the material flow is being disrupted and the new adjacent wall allows the surface tension of the fluid to pull some of the material of both walls into the corner. Also, when the jet is at the intersection of two walls and MC is being jetted on the centerline of each wall there is some material overlap between the two walls and more material is deposited at the intersection than along the wall. Without correction, this phenomenon would gradually build the corners up vertically at a higher rate than along a straight wall.

This phenomenon can be compensated for by either stopping the end of the first wall a full wall thickness away from the adjacent wall or pulling both walls back 25 percent of the wall thickness. In either case, the MC material flows into the space reducing the amount of material in the corner and diminishing the effect. At the same time, a corner is formed with an radii that is 50% of a single wall thickness.

Layer Cohesion

As droplets are laid down on top of the previous layer, there is a reflow phenomenon which acts to bond (meld) the new layer with the old layer. This reflow extends into the previous layer for only a small percentage of the layer thickness but is sufficient to accomplish several major things.

First, reflow enhances the bond between the new layer and the previous layer. Inter-layer cohesion assures an integral part when the model is finished.

Second, reflow relieves some of the stresses in the previous layer caused by shrinkage. The previous layer went through the same building technique as the new one goes through. When a layer solidifies it does so from the bottom up, since the previous layer was already relatively cold. Because the top of the layer is not constrained and the bottom is, non-uniform shrinkage occurs, this difference in shrinkage causes stress in the layer. When the new layer is applied, the reflow zone tends to relax much of the stress. By giving up the majority of its heat directly into the previous layer a degree of annealing is achieved. This mini-annealing process is repeated layer after layer.

Third, exterior part finish is improved by the reflow phenomenon. The minor melting of the cohesion/reflow zone also promotes a blending of layers at their union. This improves finish by virtue of reducing the depth of the junction at the merging of the droplet radii of the previous layer with the current layer in a fillet fashion.

Up to four layers seem, in tests, to be noticeably improved, as to surface finish and mechanical strength of the walls, by the reflowing of the cohesion zone with the previous layers.

Annealing

If, after all these steps have been carried out, there is still stress and warpage that needs to be removed, one option left is annealing. Generally, annealing is a last resort. Provided the part has remained securely mounted to the mounting plate, annealing is generally not required. However, when annealing is required one of following procedures should be followed.

A decision must be made as to whether the annealing should be done before the part is removed from the mounting plate or after. This decision is based on the geometry of the part and the ability of the part to withstand its own weight when heated.

After the decision that annealing is necessary has been made the part with or without the mounting plate is placed in an oven that has been heated to 80 degrees celsius. This process requires very close monitoring. Also, the oven must be held very uniformly at an even temperature throughout. An air circulating oven is recommended. When the temperature returns to the set temperature of 80 degrees the part is exposed to the heat for a period of time depending on wall thickness. The heavier and thicker the part the longer it will take to anneal. Generally, a rule of thumb is that it takes 20 minutes minimum regardless of how small the part and 10 minutes extra for each 1 mm of wall thickness. When the prescribed time has elapsed and the part seems to be completely annealed, the oven is turned off and allowed to cool on its own uninterrupted. When the oven temperature reaches 30 degrees celsius the part is safe to remove. However, the cool down rate should not exceed 2 to 3 degrees per minute. If it does, there is a risk of reintroduced stress.

Alternatively, with the mounting plate still attached the model can be allowed to soak inverted in an annealing bath (e.g. of BIOACT® VSO, a high flashpoint petroleum distillate manufactured by PETROFERM, Inc.) at 40° C. to 50° C. The temperature is raised at a slow rate (e.g. 1° C./minute to ≅70° C.) where it soaks for ≅15 to 20 minutes. The base must remain cool to prevent separation and this may be achieved by a cold water or ice bath placed on top of the base.

In unusual situations there may be a need for specialized fixturing. When this is called for the same guidelines as outlined above are used. The only exception is that the fixture must be at room temperature when the part is mounted and more time must be allocated for the heat up and the cool down cycles. Thermal probes are also recommended for the fixture.

Contour Molding Technique

Figure 19:
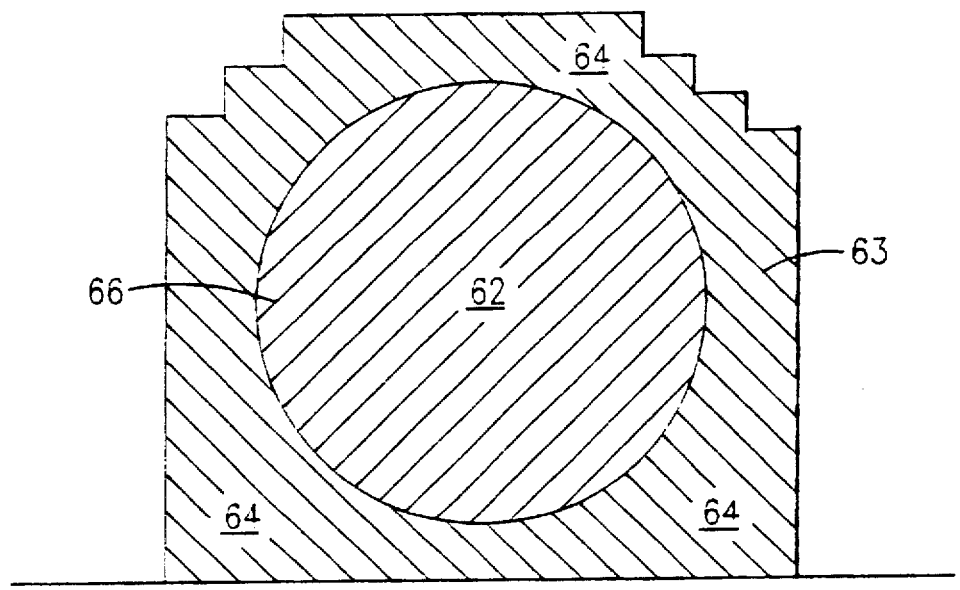
FIGS. 19 through 20 diagrammatically illustrate a model built by contour molding techniques.

An alternative method for computer-controlled manufacture of 3-D objects with the present model maker is illustrated in FIG. 19. This method involves dispensing a low melting point support material 64, hereafter referred to as LMP, onto a platform at predetermined locations, which hardens to form a layer of a supporting contour mold 63 surrounding and defining the outline of the desired model pattern layer. A high melting point build material 62, hereafter HMP, is then dispensed, by jetting, spraying, continuous stream, etc., to fill the contour mold and complete the pattern layer. The uppermost surface of each completed layer is then milled, thus removing a portion of LMP and any stray HMP to expose the underlying LMP for deposition of the next LMP contour mold layer. These steps are repeated until the desired 3-D model 6, surrounded by a supporting contour mold 63, is completed. At this point, the model is heated in air or a solution that will not melt or dissolve the HMP 62, but will melt or dissolve the contour mold 63 formed of LMP 64, leaving the 3-D model intact. The melting process is combined with a stress relief anneal that minimizes model distortion.

Figure 20:
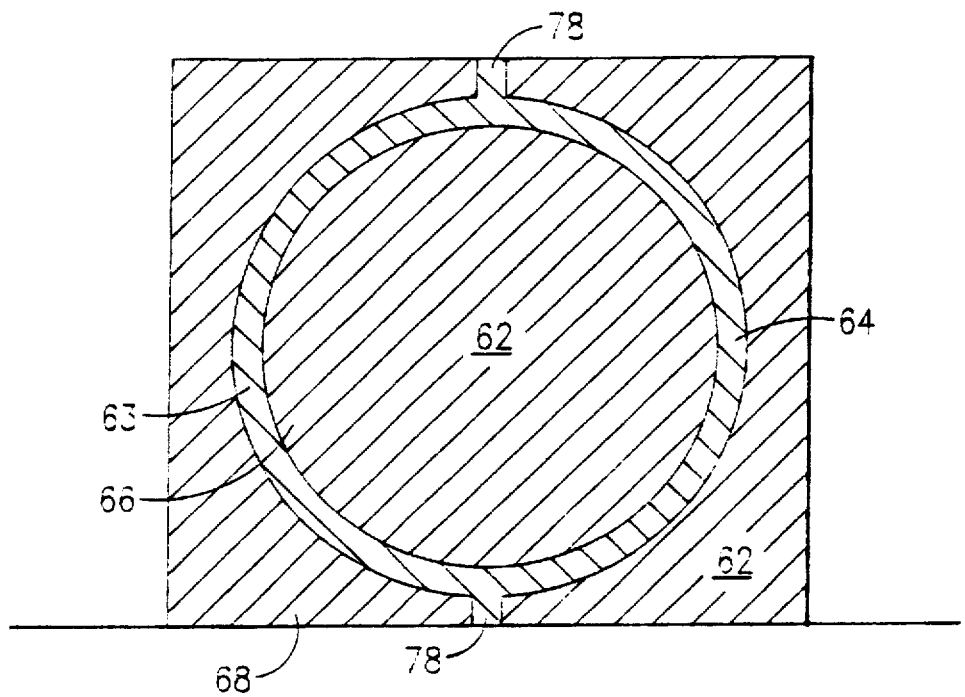
Figure 21:
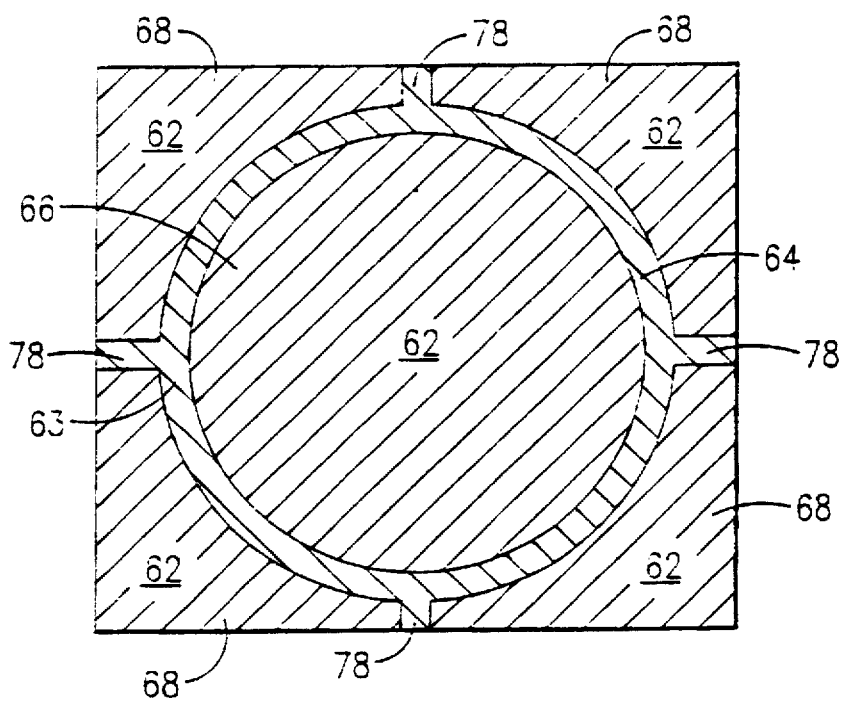

The support structure 68 may be formed of HMP 62 that is the same material as the HMP build material used to form the model 66, as illustrated in FIGS. 20 and 21, such that shrinkage stresses are more controllable and differential expansion problems during model cooling, etc., will be minimized. When the support structure 68 is formed of HMP 62, the support structure is preferably sectioned by layers or webs 78 of LMP 64, to facilitate removal of the HMP support structure 68 after the LMP 62 is melted.

Some model clean up may be required to remove support sections, particularly interior sections of the model. Moreover, contour Web techniques may require a software file look-head to minimize the number of Webs and determine their location to facilitate support section removal. Multiple contour offsets can also be determined by software look ahead.

Only one outline or layer of LMP 64 is required to form the contour mold, as illustrated in FIG. 19, provided the surface of the desired 3-D object is a continuous profile during Z-axis build. Multiple outlines could be provided as required by software that checks the next layers profile and/or by heavier, thicker layers deposited to quickly form concept models.

Alternative vector spray techniques, discussed in further detail below, may be used for depositing the HMP building material when forming the support structure of HMP. Likewise, cross hatch spray patterns can be used where bulk fill is required and more rapid cooling is desirable.

When contour molding as discussed above, the melting point of both materials must be relatively close to prevent "contour meltdown" and contour deformation. For example, the LMP may have a melting point of 60° to 70° C. and the HMP may have a melting point of 80° C. or higher. Contour deformation can be minimized by applying a first pass light vector spray coat over contour outline to "build up local thermal mass".

Contour Molding With U.V Curable Material

Contour molding using a U.V. curable material is essentially the same as the method discussed above, except for a U.V. curable build material is used to form the desired 3-D object (as illustrated in FIG. 19), and if desired, to form the support structure (as illustrated in FIGS. 20 and 21). By using a U.V. curable material, such as a U.V. curable plastic, superior engineering materials having superior hardness, higher melting points and better cutting characteristics are available. A build material that has the hardness and durability of the desired final product may also be used. This eliminates the time spent on forming a wax model first, that is then used to form a final prototype object of a material with the desired hardness or other desired property.

If the support material is a sulfonamide, due to its higher temperature and superior cutting characteristics, as compared to wax, each layer may be milled at high speed (2–4 inches/second) immediately after quick U.V curing of each completed layer. No wait time is required for cooling after deposition of material. The support material may alternatively be a water soluble wax, thus allowing removal of the support material with a citrus water solution. A catalytically cured or a thermosetting build material may be used instead of a U.V cured material.

Using a U.V. cured, catalytically cured, or thermosetting material provides for a greater selection of engineering materials with varying degrees of hardness and strength than are available when depositing drops of molten material. A high speed "Lee type" high frequency (−2,000 hz.) valve may be used in place of the piezo actuated jet. This greatly expands the range of usable viscosity and surface tension. For the continuous quick fill of interior portions of a model, the valve is opened to deposit a continuous stream or spray of material at the proper location.

An advantage of using UV or catalytically cured materials, for example, plastics, is that the material can be clear or colored with transparent dies. Thus, by using four jet heads for depositing subtractive colors, clear, red, magenta and cyan, for example, virtually any desired color and shade may be formed by firing the proper combination of jet heads. Using the above technology, many differently colored and shaded patterns may be provided in a single transparent pattern layer. In this manner a transparent 3-D model may be built, in which interior 3-D formations, e.g. the interior of an engine or of a biological organism, for example, may be observed from any desired angle.

The pattern layers could, for example, be identical to the slices produced by a Cat Scan or MRI. By making the slices the same as those produced by a Cat Scan or MRI, a transparent 3-D representation of what the Cat Scan or MRI sees can be produced, which would be quite useful for medical or industrial purposes. By extrapolating the data between the slices produced by a Cat Scan or MRI, thinner slices can be used to build the model layer patterns than are produced by a Cat Scan or MRI, and the finished 3-D representation can be improved.

Figure 22:
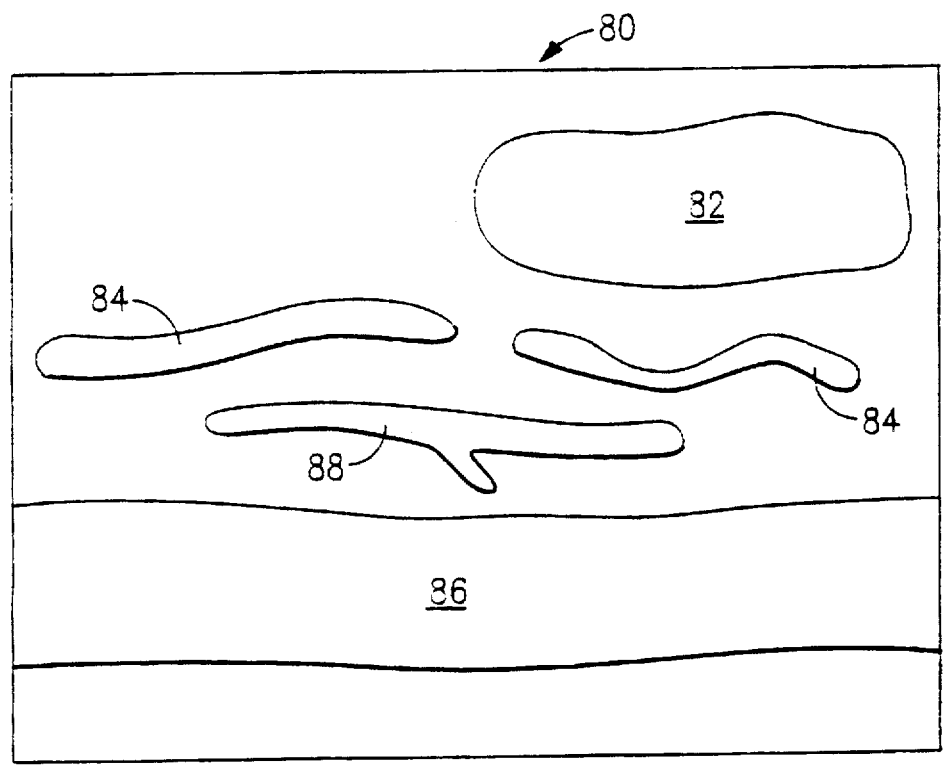
FIG. 22 is a diagrammatic plan view of a cross-sectional slice of a transparent 3-D medical model.

The finished result would be a highly accurate solid, transparent 3-D hologram that could be handled, turned and studied from any desired angle for a variety of purposes, such as pre-operative planning, models for study, etc. A transparent 3-D biological model of a brain tumor, for example, would greatly facilitate the removal of such a tumor from the brain without damaging critical areas of the brain. FIG. 22 diagrammatically illustrates a cross-sectional slice 80 of such a transparent 3-D model containing a cancerous tumor 82 and surrounding arteries 84, bone 86 and nerves 88.

In order to get clearer boundaries between different boundaries of the multiple patterns, it is preferable to make peripheral vector boundaries, as previously disclosed in relation to building exterior surface defining walls. To assist in getting crisper boundaries, it may be helpful to form the peripheral boundaries with material at an elevated temperature. In this manner, as the material cools on contact with the model, the viscosity increases and holds the pattern until the U.V. or Catalytic cure. After the cure, the layers may be milled to the proper thickness as desired or necessary to control layer growth as previously described.

Constant Stream Model Building

Figure 23:
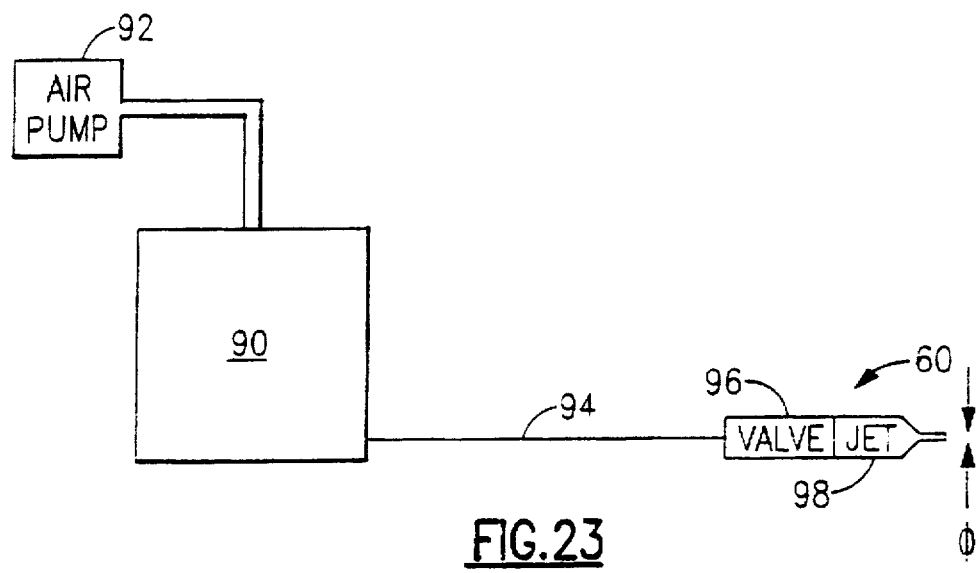
FIG. 23 is a diagrammatic illustration of a jet head and material supply system for emitting a constant stream of modeling material in liquid form.
Figure 24:
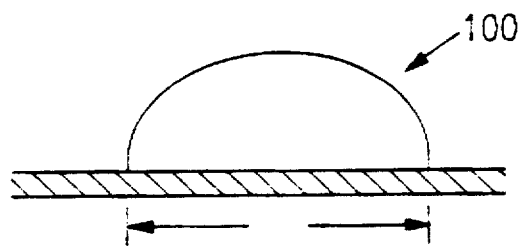
FIG. 24 is a cross section of a continuous bead of molten material deposited by the system of FIG. 20.
Figure 25:
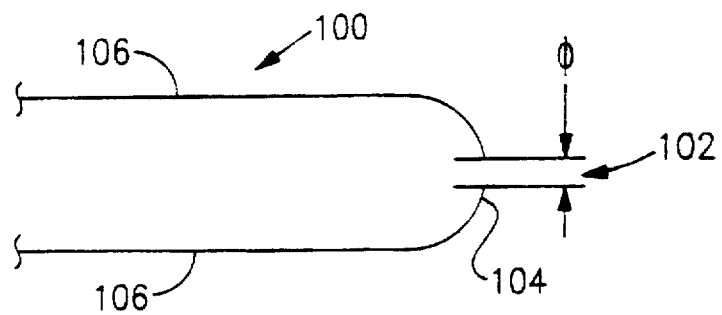
FIG. 25 is a top view of a continuous stream and a continuous bead formed thereby.
Figure 26:
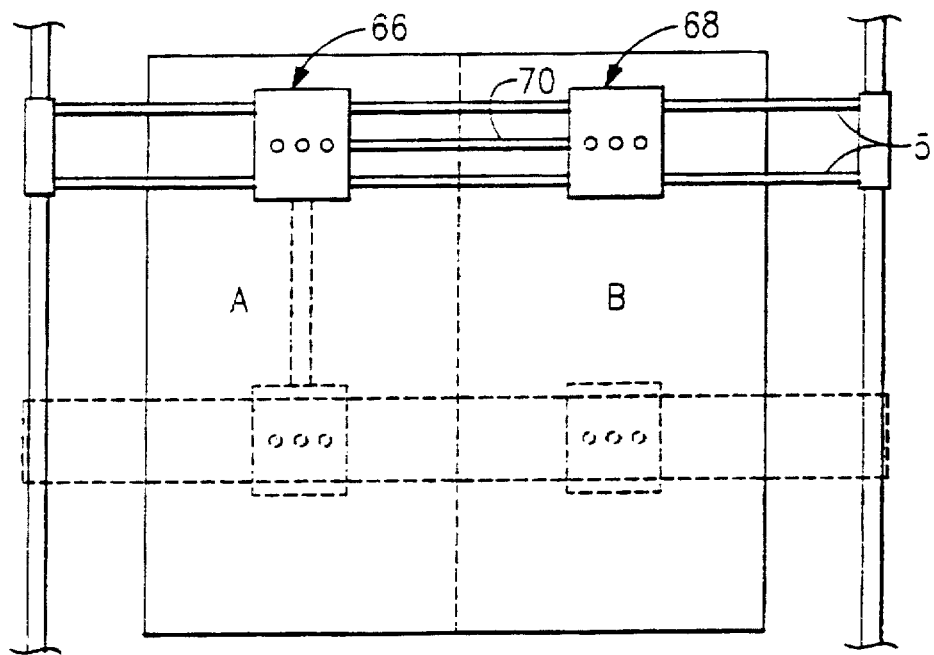
FIGS. 26 and 27 diagrammatically illustrate model makers with a plurality of jets for simultaneously building a plurality of models by moving the jets in parallel motion.
Figure 27:
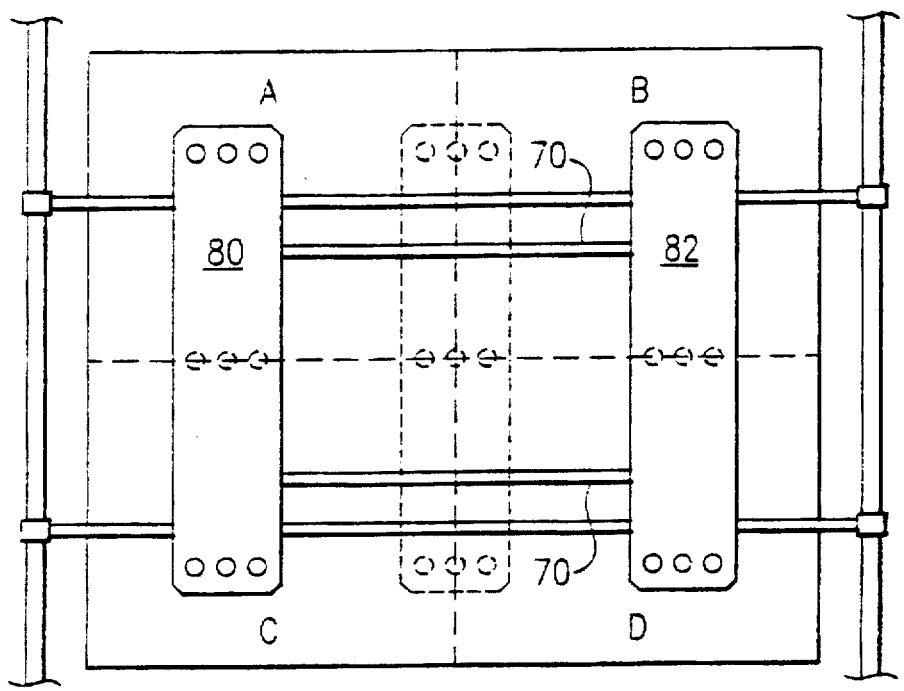

An apparatus and method for building a model by emitting an elongate bead forming a constant stream of a molten MC, rather than emitting bead producing drops on demand, is diagrammatically illustrated in FIGS. 23–25. In this method the stream of molten MC emitted from the jet head is controlled to supply a substantially constant volume V of MC as a function of displacement of the jet head. In other words, the volume Q of MC emitted from the jet head is maintained at a constant proportion (Q/V) to the velocity V of the jet head. In this manner, an elongate continuous bead of MC with a substantially constant cross section is deposited upon the support surface or previously deposited bead.

A jet head and supply system for emitting a substantially continuous stream of MC is diagrammatically illustrated in FIG. 23. In the illustrated system, a heated supply reservoir 90, for supplying molten MC, is provided with an air pump 92 to pressurize the reservoir to a substantially constant pressure of preferably 39,500–48,000 Pa (5–7 psi). The pressure in the supply reservoir 90 forces the molten MC through the supply line 94 and out the jet head 60 in a continuous stream of material. An electro-mechanical valve 96 is provided in or just upstream of the jet head for controlling the rate of emission of MC from the jet head to provide a volume of MC as a function of the displacement of the jet head.

Since the jet head of the present embodiment emits a continuous stream of MC, a greater volume of MC is emitted from the jet in a given amount of time, as compared to the previously disclosed embodiments that emit discrete drops of MC. Thus a continuous stream of MC may advantageously be used to quickly fill interior portions of models.

Moreover, with accurate control of the valve 96, the velocity and volume of the stream of MC may be controlled as a function of displacement of the jet head, such that a substantially constant volume of MC is deposited per unit of displacement. In this manner, an elongate bead of MC having a substantially constant cross section, as diagrammatically illustrated in FIGS. 21 and 22, may be deposited, for forming outer surface defining walls of a model via vector plotting, at a faster build rate than is possible via the previously disclosed drop on demand methods.

When depositing a constant stream of modeling material, the resulting elongate bead 100 of molten MC will have two freeze fronts at which the molten MC forming the bead cools and changes phase into a solid, as illustrated in FIGS. 24 and 25. In particular, the elongate bead of MC has one freeze front 104 in the direction of motion and one freeze front 106 perpendicular to the direction of motion. Therefore, it is preferable that a relatively narrow stream 102 of molten MC be emitted from the jet head.

A relatively narrow stream provides for a more stable and therefore a more constant volume of MC. Thus, a narrow stream provides for a more stable and accurate placement of the stream when vector plotting. The velocity of the stream, however, is limited by the Weber number W of the molten MC. Therefore, the narrower the stream of MC, the longer the build time. The maximum stream velocity can be determined by the ratio W/ø, where W is the MC's Weber number and ø is the diameter of the stream emitted from the jet head. The weber number is preferably less than 80, i.e $W \leq 80$. Since the MC is forced under pressure from the jet head, the stream of MC expands as it exits the jet head. As a result the resulting stream has a outer diameter that is greater than the internal diameter of the orifice of the jet head.

The system illustrated in FIG. 23 has a combined function jet head that can operate in both a drop on demand mode and a continuous stream mode. The combined function jet head 60 has a standard piezo-actuated drop on demand jet head 98 for operating the combined function jet head in the drop on demand mode, and an electro-mechanical valve 96 for operating the jet head in the continuous stream mode.

In a preferred method, the jet head is operated in a fine control drop on demand mode for forming outer surface defining walls of a model having a desired surface finish via vector plotting of beads of MC, as disclosed above. In the drop on demand mode, the electro-mechanical valve 96 is open, and the supply reservoir 90 and the air pump 92 are vented to the atmosphere, so that atmospheric conditions exist in the supply reservoir 90. In this manner, molten MC is supplied to the jet head by a siphoning action. Interior portions of the model are subsequently relatively quickly filled by operating the jet head in the constant stream mode. In the constant stream mode, the electro-mechanical valve 96 is closed and the supply reservoir 90 is sealed and pressurized by the air pump 92 to the desired internal pressure. Once the desired internal pressure is achieved, the electro-mechanical valve 96 is opened under control, for emission of MC from the jet head. The volumetric rate of emission Q of MC from the jet head is controlled by adjusting the electro-mechanical valve 96. Upon completion of filling, the electro-mechanical valve 96 is closed and the supply reservoir 90 is again vented to the atmosphere for operation of the jet head in the drop on demand mode. These steps are repeated to form subsequent layers until the model is complete.

It can be appreciated the rate of emission of MC may alternatively be controlled by adjusting the pressure in the supply reservoir, thus eliminating the need for an electro-mechanical valve near or in the jet head. However, it is preferable to maintain the pressure in the supply reservoir constant and control the rate of emission of MC from the jet head with a electro-mechanical valve. Likewise, it is appreciated that two jet heads, a drop on demand jet head and a continuous stream jet head, may be employed in place of the previously disclosed combined jet head.

Vector Spray Model Building

Rather than emitting a constant stream, the jet head may be configured to emit the MC in a spray. Vector spraying minimizes mechanical complexity and reduces amount of material needed for support structures. "Atomized" spraying of build material should reduce bulk shrinkage of model. When spraying, it is possible to make models at less than 100 percent density, due to temperature control as microsphere droplets coalesce thereby further reducing stress, which is good for investment castings.

Spray application (atomizer) allows control of very thin layers, therefore the contour could remain the same for high resolution layers with minimal material waste. Multiple contour walls and multiple passes of sprays can be used to reduce stress and increase build speed in "concept" models or extrusion sections.

Airborne particulates may need to be filtered or electrostatically precipitated from the model forming chamber. If an air brush is used as the spray applicator, than a compressor/ballast tank/regulator system is required to control the amount of material that is sprayed from the jet head.

Parallel Building of a Plurality of Models

In order to simultaneously build a plurality of models in parallel, two or more sets of jet heads can be mounted on the Y-coordinate rails 5. FIG. 26 illustrates two sets of jet heads 66 and 68 mounted upon the Y-coordinate rails 5 for building two models simultaneously in areas A and B on the support table. The two sets of jets 66, 68 are interconnected and spaced by a rigid linkage 70, so that the two jet heads move along the Y-coordinate rail 5 together.

When two sets of jets are mounted to the Y-axis rail as illustrated in FIG. 26, the rigid linkage 70 preferable has a length that is approximately one-half the width of the build table. In this manner the build table is separated into two equal areas A and B, one for each of the models. It can be appreciated that more than two jet heads may be mounted to the Y-axis rail and interconnected by rigid linkages that separate the jet heads by a distance that is equal to the width of the build table divided by the number of jet heads, thereby separating the build table into a number of areas A, B . . . N corresponding to the number of jet heads. As is readily apparent, as the number of jet heads mounted to the rail increases, the size of the models that can be created correspondingly decreases.

In the above arrangement, the first set of jet heads 66 is preferably permanently mounted on the rail 5. Whereas the additional sets of jet heads 68, etc., are removably attached to the rail, to be attached and removed as desired. Linkage 70 may be adjustable, or there may be a plurality of sets of linkages 70 of different lengths, depending on the number of jet heads to be mounted to the rail 5. In this manner, a single set of jets may be used to build a single large model that occupies the entire build surface. Alternatively, a plurality of narrow models, that only occupy a specific area of the build table, may be built with a plurality of sets of jet heads.

The support table may be divided into areas in the X-coordinate direction as well as the Y-coordinate direction by mounting two or more sets of heads on two or more carriages 80 and 82 mounted on the Y-coordinate rail 5. Carriages 80 and 82 are likewise interlinked by rigid linkages for parallel movement along the Y-coordinate rail 5. FIG. 27 illustrates an embodiment in which two carriages are mounted on the Y-coordinate rails 5 for parallel movement, each carriage contains two sets of jet heads. With this construction, the support table is divided into quadrants A through D for building 4 models simultaneously by moving all four sets of jets in parallel over the support table. It can be appreciated that, as in the above embodiment, two or more carriages may be mounted along the Y-coordinate rails and more than two sets of jets may be mounted on each carriage. An optional third carriage and a third set of jets on each carriage are illustrated in ghost FIG. 27.

Any desired matrix, such as a two-by-two, three-by-two, three-by-three, as illustrated in ghost FIG. 27, etc., may be provided. If desired, the jet heads may be staggered from one row to the next, in order to efficiently use the available space on the build table. For example, a matrix in which the sets of jet heads in alternate, even numbered rows are staggered halfway between the sets of jet heads in alternate odd numbered rows. Rows of sets of jet heads numbering three-two-three, for example, may be employed, in which the two sets of jet heads in the middle row are staggered halfway between the outer rows. In this manner, it is feasible to provide a much larger machine for simultaneously building a large number of identical models in parallel.

The structure illustrated in FIGS. 26 and 27 will build a plurality of models in approximately the same build time as it takes to build a single model with a single set of jets. Thus, an entire family of identical models may be built in approximately the same time as it takes to build a single model. The increased inertia of the large assembly illustrated in FIGS. 26 and 27 only slightly slows down the motion of the jet heads and only slightly increases the build time. The slight increase in build time is more then off-set by the simultaneous parallel creation of a plurality of models with a plurality of jet heads.

Since a plurality of carriages are moved in parallel, a plurality of models are built at the same time and the carriages must only be moved over a predetermined pattern a single time to form the plurality of models. On the other hand, if the same number of a plurality of models are to be built using a single jet head, the carriage needs to be moved over the predetermined pattern for each of the models. Thus, the mechanical wear is reduced when moving a plurality of jet heads in parallel. By providing an adaptable system in which sets of jet heads may be added and removed as desired to form a desired corresponding plurality of models, the system may be easily customized for manufacturing prototypes or manufacturing individual batches of products. Likewise, the set up can be customized as needs change. Moreover, a number of sets of jet heads that is larger than the desired number of models may be provided to accommodate for jet failure in one of the jet heads. In this manner, even if one of sets of jet heads fails, there will still be a sufficient number of models produced by sets of jet heads that have not failed to fill an order.

Conclusion

It can be appreciated that the various methods of model building described above are not exclusionary of each other. The different methods may be combined or used together to produce the desired result. For example, a plurality of models may be built in parallel using via contour molding, using continuous stream or drop on demand wax building methods, with any of the disclosed lattice structures being used to form interior and/or support structures. Portions of the model may be formed by spraying, while other portions are formed by dropping beads of material on demand. The possible combinations, and modifications are too numerous to list herein.

We claim:

1. A method of producing a 3-D model by forming a contiguous plurality of parallel layers of modeling material on a platform comprising the steps of:
   a) producing a plurality of bead producing drops of the modeling material for deposition from a drop on demand jet at desired locations to solidify into beads to form at least a portion of a layer of said parallel layers;
   b) controlling the locations of deposition by simultaneously coordinating relative movement in the X-Y coordinates for a support arrangement of said jet to produce vectors, defined by overlapping pluralities of the beads, in any and all directions required to produce, by vector plotting, at least a desired outer surface defining wall;
   c) timing the production of said plurality of beads, at least, when producing said desired outer surface defining wall to overlap previously deposited beads to a desired extent and to meld with previously deposited beads to produce said vectors, thereby forming said desired outer surface defining wall with a desired surface finish;
   d) adjusting the distance of the location of drop production to the location of drop deposition following formation of said layer in preparation for the formation of a subsequent said layer; and
   e) repeating steps a), b), c), and d) as required to complete the model.

2. The method according to claim 1, further comprising the step of machining, at select intervals, the last deposited layer to a uniform thickness along a plane defined by the layers before depositing a said next layer of the model.

3. The method according to claim 2, further comprising the step of machining each deposited layer along said plane before deposition of a said next layer of the model, thereby to form said desired outer surface defining wall with a desired surface finish.

4. The method according to claim 3, wherein the step of machining comprises removing at least about 25% of the thickness of each layer.

5. The method according to claim 2, further comprising the steps of:
   depositing a wall of support material contiguous with the outer surface of at least said desired outer surface defining wall after shrinkage of the deposited modeling material, but before machining, to support the outer surface defining wall during machining, thereby to substantially prevent delamination, fraying, and chipping of said desired outer surface defining wall during machining and form said desired outer surface defining wall with a desired surface finish; and
   subsequently removing the support material.

6. The method according to claim 1, further comprising the step of depositing at least one of a molten modeling material and a molten fill and support material to produce lattice walls, to at least one of i) support cantilever portions and other overhanging portions of the model during production and ii) provide a fill structure in interior spaces of the model.

7. The method according to claim 6, wherein the step of depositing molten material to produce lattice walls comprises, producing a plurality of unidirectional walls oriented and joined with the outer surface defining wall to provide desired reinforcement of hollow models.

8. The method according to claim 6, wherein the step of depositing molten material to produce lattice walls comprises producing a plurality of bi-directional walls oriented and joined with the outer surface defining wall(s) to provide desired reinforcement of hollow models.

9. The method according to claim 6, wherein the step of depositing molten material to produce lattice walls comprises producing an interconnecting inner wall structure, that is intimately connected to an outer wall structure formed during the formation of the same layer to provide desired reinforcement of hollow models.

10. The method according to claim 9, further comprising the step of closing off the top of the model with a single layer of modeling material by:
    a) depositing beads of molten modeling material on a first half of a top surface of each outer and lattice wall of the modeling during a first pass;
    b) depositing beads of molten modeling material on a second half of the top surface of each outer and lattice wall of the model during a second pass, such that the molten modeling material flows down the sides of the walls and, due to capillary action, surface cohesion and surface tension, contact and meld with adjacent beads, closing off the top of the model with a single layer of modeling material.

11. The method according to claim 10, further comprising the steps of:
    before closing off the top of the model with a single layer of modeling material, machining the last deposited layer along plane defined by the layer; and
    after closing off the top of the model with a single layer of modeling material, machining along a plane defined by the layer.

12. The method according to claim 1, further comprising the step of depositing a plurality of differently colored and transparent build materials in each layer to produce a transparent 3-D model, in which interior 3-D formations can be seen.

13. The method according to claim 12, wherein the step of depositing a plurality of differently colored and transparent build materials in each layer produces a biological model.

14. The method according to claim 12, depositing a plurality of differently colored and transparent build materials in each layer to form a 3-D model in which each layer accurately represents a corresponding slice produced by a medical imaging machine to produce an accurate at least partially transparent biological model.

15. The method according to claim 12, further comprising the step of forming at least the outer boundary defining layers of the differently colored build materials by vector plotting, to facilitate formation of distinct boundaries between the differently colored build materials.

16. The method according to claim 15, further comprising the step of depositing the modeling material, at least when forming the outer boundary defining layers, at an elevated temperature, such that the build material cools upon contact with the model to hold the desired pattern until the layer hardens.

17. The method according to claim 1, further comprising the step of filling interior spaces of the model with fill material by depositing a constant stream of fill material.

18. The method according to claim 1, further comprising the step of simultaneously producing pluralities of bead producing drops of modeling material, to simultaneously build a corresponding plurality of substantially identical models.

19. A method according to claim 1, further comprising the step of controlling rate of production of the plurality of beads, at least when forming said desired outer surface defining wall of the model, in response to vector plotting speed, acceleration and direction to provide a constant vector bead pitch regardless of speed, acceleration, angle or curvature of said vector, thereby to provide said outer surface defining wall of modeling material with a substantially constant width and with sides having a desired surface quality regardless of speed, acceleration, direction or curvature of said vector.

20. The method according to claim 1, wherein the 3-D model is a contour mold and said desired outer surface defines a portion of the interior of the mold, comprising the steps of:

f) filling the contour mold with a build material to produce a layer of a molded model, with at least a desired outer surface defining wall of the model, molded by said inner surface defining wall, having a desired surface finish;

g) adjusting the distance of the location of drop production to the location of drop deposition following formation of said layers in preparation for formation of a subsequent said layer;

h) repeating steps a), b), c), d), e), f) and g) as required to complete the contour mold and the molded model; and i) removing the contour mold.

21. A method according to claim 20, further comprising the step of machining each completed layer to remove any build material accidentally deposited on the contour mold to expose the contour mold before deposition of the next layer of the contour mold.

22. The method according to claim 21, comprising the steps of:

depositing one of a U.V. curable, catalytically curable and thermosetting build material to fill the contour mold;

causing each layer to solidify before machining; and removing the contour mold by one of melting and dissolving the modeling material.

23. The method according to claim 20, comprising the steps of:

depositing a relatively low melting point, LMP, modeling material to form the contour mold and a relatively high melting point, HMP, build material, as compared to the LMP, to fill the contour mold;

machining each layer after that layer has cooled; and removing the contour mold upon completion of the model by one of melting and dissolving the contour mold.

24. The method according to claim 23, wherein the LMP has a melting point from about 60° to about 70° C. and the HMP has a melting point of at least about 80° C.

25. The method according to claim 23, further comprising the step of depositing HMP to form a support structure to support overhanging portions of the contour mold.

26. The method according to claim 25, further comprising the step of depositing webs of LMP to separate sections of the support structure and facilitate removal of the support structure upon completion of the model.

27. The method according to claim 20, further comprising the steps of:

depositing a plurality of differently colored and transparent build materials in each layer to produce a transparent 3-D model, in which interior 3-D formations can be seen.

28. The method according to claim 27, depositing the plurality of differently colored and transparent build materials to form a plurality layers that accurately represent corresponding slices produced by a medical imaging machine, thereby to produce an accurate partially transparent biological model.

29. The method according to claim 27, further comprising the step of forming the different colored and transparent build materials at least at an outer boundary defining layer by vector plotting, to facilitate formation of distinct boundaries between the differently colored build materials.

30. The method according to claim 29, further comprising the step of depositing the build material, at least when forming the outer boundary defining layers, at an elevated temperature, such that the build material cool upon contact with the model to hold the desired pattern until solidification of each layer.

31. A method according to claim 20, further comprising the step of controlling rate of production of the plurality of beads of modeling material, at least when forming said desired inner surface defining wall of the contour mold, in response to vector plotting speed, acceleration and direction to provide a constant vector bead pitch regardless of speed, acceleration, angle or curvature of said vector and thereby provide said desired portion of said inner surface defining wall of the contour mold with a substantially constant width and sides with a desired surface quality regardless of speed, acceleration, direction or curvature of said vector.

32. The method according to claim 20, comprising the steps of depositing the modeling material, at least when forming said inner surface defining wall of the contour mold by vector plotting and filling the contour mold with build material by raster scanning.

33. The method according to claim 20, comprising the step of filling the contour mold with build material by depositing a constant stream of build material.

34. A 3-D model maker for producing a 3-D model by sequentially forming layer upon layer, by plotting vectors of modeling material, one layer at a time comprising:

a) a support means defining a surface for supporting the 3-D model during production;

b) a drop on demand jet means for ejecting discrete bead producing drops of molten modeling material one drop at a time upon demand to meld with previously deposited beads, thereby to plot vectors of modeling material defining the layers;

c) mounting means mounting the jet means i) for simultaneous movement along at least two axes of an X, Y, Z axis coordinate system relative to said surface to move the jet means along any desired vector direction while said jet means plots said vectors of modeling material on said surface and ii) for movement of the jet means, when desired, along all three of the X, Y, Z axes of the system, relative to said surface; and d) control means i) for providing vector plotting control of movement of the mounting means to move the jet means simultaneously along the at least two axes of the X, Y, Z axis coordinate system, and ii) for controlling the timing of the ejection of bead producing drops of molten modeling material by the jet means to overlap previously deposited beads to a desired extent and to meld with previously deposited beads to generate vectors of modeling material, defined by the beads, in any and all directions required to produce, layer by layer by vector plotting, at least a desired outer surface defining wall-of the model with a desired surface quality.

35. A model maker according to claim 34, wherein said jet means also comprises a continuous stream jet means, for ejecting an elongate bead producing continuous stream of molten modeling material to meld with previously deposited elongate beads, thereby to plot vectors of modeling material defining the layers, such that said jet means is a combined drop on demand and continuous stream jet means, for selectively emitting one of i) discrete bead producing drops and ii) an elongate bead producing continuous stream of molten modeling material, as desired.

36. A 3-D model maker for producing a 3-D model by sequentially forming layer upon layer, by plotting vectors of modeling material, one layer at a time comprising:

a) a support means defining a surface for supporting the 3-D model during production;

b) a continuous stream jet means for ejecting an elongate bead producing continuous stream of molten modeling material to meld with previously deposited beads, thereby to plot vectors of modeling material defining the layers;

c) mounting means mounting the jet means i) for simultaneous movement along at least two axes of an X, Y, Z axis coordinate system relative to said surface to move the jet means along any desired vector direction while said jet means plots said vectors of modeling material on said surface and ii) for movement of the jet means, when desired, along all three of the X, Y, Z axes of the system, relative to said surface; and d) control means i) for providing vector plotting control of movement of the mounting means to move the jet means simultaneously along the at least two axes of the X, Y, Z axis coordinate system, and ii) for controlling the volumetric rate of ejection of the bead producing stream of molten modeling material by the jet means to generate vectors of modeling material, defined by the beads, in any and all directions required to produce, layer by layer by vector plotting, at least a portion of at least the outer surface defining walls of the model with a substantially continuous thickness and thereby provide walls with a desired surface quality.

37. A model maker according to claim 36, wherein said jet means further includes a drop on demand jet means jet means, for ejecting discrete bead producing drops of molten modeling material, upon demand, to overlap previously deposited discrete beads to a desired extent and to meld with previously deposited discrete beads, thereby to plot vectors of modeling material defining the layers, such that said jet means is a combined drop on demand and continuous stream jet means for selectively ejecting one of i) a an elongate bead producing continuous stream and ii) discrete bead producing drops of modeling material, as desired.

38. A method of producing a 3-D model by forming a contiguous plurality of parallel layers of modeling material comprising the steps of:

a) producing a plurality of bead producing drops of the modeling material for deposition at desired locations to solidify into beads to format least a portion of a layer of said parallel layers;

b) controlling the locations of deposition to produce vectors, defined by overlapping pluralities of the beads, in any and all directions required to produce, by vector plotting, at least a desired outer surface defining wall;

c) timing the production of said plurality of beads, at least, when producing said desired outer surface defining wall to overlap previously deposited beads to a desired extent and to meld with previously deposited beads to produce said vectors, thereby forming said desired outer surface defining wall with a desired surface finish;

d) adjusting the distance of the location of drop production to the location of drop deposition following formation of said layer in preparation for the formation of a subsequent said layer; and e) repeating steps a), b), c), and d) as required to complete the model.

39. A method of producing a 3-D model by forming a continuous plurality of parallel layers of modeling material comprising the steps of:

a) producing a plurality of bead producing drops of the modeling material for deposition at desired locations to solidify into beads to format least a portion of a layer of said parallel layers;

b) controlling the locations of deposition to produce vectors, defined by overlapping pluralities of the beads, in any and all directions required to produce, by vector plotting, at least a desired outer surface defining wall;

c) timing the production of said plurality of beads, at least, when producing said desired outer surface defining wall to overlap previously deposited beads to a desired extent and to meld with previously deposited beads to produce said vectors, thereby forming said desired outer surface defining wall with a desired surface finish;

d) adjusting the distance of the location of drop production to the location of drop deposition following formation of said layer in preparation for the formation of a subsequent said layer;

e) machining, at select intervals, the last deposited layer to a uniform thickness along a plane defined by the layers before depositing a said next layer of the model, wherein the step of machining comprises milling a coarse cut that removes a top, of the last deposited layer substantially to the plane during a first pass and milling a fine climb cut that removes the remainder of the deposited layer down to the plane during a return pass; and f) repeating steps a), b), c), d), and e) as required to complete the model.

40. The method according to claim 39, wherein the step of milling a coarse cut comprises removing a layer of material sufficiently thick that a layer less than approximately 0.01 mm thick is removed during the fine climb cut.

41. A method of producing a 3-D model by forming a contiguous plurality of parallel layers of modeling material comprising the steps of:

a) producing a plurality of bead producing drops of the modeling material for deposition at desired locations to solidify into beads to format least a portion of a layer of said parallel layers;

b) controlling the locations of deposition to produce vectors, defined by overlapping pluralities of the beads, in any and all directions required to produce, by vector plotting, at least a desired outer surface defining wall;

c) timing the production of said plurality of beads, at least, when producing said desired outer surface defining wall to overlap previously deposited beads to a desired extent and to meld with previously deposited beads to produce said vectors, thereby forming said desired outer surface defining wall with a desired surface finish;

d) adjusting the distance of the location of drop production to the location of drop deposition following formation of said layer in preparation for the formation of a subsequent said layer;

e) when an inter-layer build angle of an outer surface defining wall is less than a predetermined critical angle from vertical: i) forming the outer surface defining wall by depositing at least two contiguous layers of beads of modeling material to produce said desired outer surface defining wall; and ii) filling interior spaces of the model by depositing a single layer of support material formed by drops that are substantially twice as large as said bead producing drops of modeling material, thereby to decrease the time required to fill said interior spaces; and f) repeating steps a), b), c), d), and e) as required to complete the model.

42. The method according to claim 41, further comprising the steps of, at least when the inter-layer build angle exceeds the critical angle from vertical:

depositing a support material at least, contiguous with, said outer surface defining wall during formation of each layer, to support beads of said outer surface defining wall in the next layer formed.

43. The method according to claim 42, wherein the critical angle is approximately 30 degrees from vertical.

44. A method of producing a 3-D model by forming a contiguous plurality of parallel layers of modeling material comprising the steps of:

a) producing a plurality of bead producing drops of the modeling material for deposition at desired locations to solidify into beads to format least a portion of a layer of said parallel layers;

b) controlling the locations of deposition to produce vectors, defined by overlapping pluralities of the beads, in any and all directions required to produce, by vector plotting, at least a desired outer surface defining wall;

c) timing the production of said plurality of beads, at least, when producing said desired outer surface defining wall to overlap previously deposited beads to a desired extent and to meld with previously deposited beads to produce said vectors, thereby forming said desired outer surface defining wall with a desired surface finish;

d) adjusting the distance of the location of drop production to the location of drop deposition following formation of said layer in preparation for the formation of a subsequent said layer;

e) depositing at least one of a molten modeling material and a molten fill and support material to produce lattice walls, to at least one of i) and ii), wherein,
 i) support cantilever portions and other overhanging portions of the model during production, and
 ii) provide a fill structure in interior spaces of the model, and wherein depositing molten material to produce lattice walls comprises producing an interconnecting inner wall structure, that is intimately connected to an outer wall structure formed during the formation of the same layer to provide desired reinforcement of hollow models, and further wherein the step of producing said interconnecting inner wall structure that is intimately connected to said outer wall comprises the steps of:
 1) forming the outer wall structure of the model;
 2) filling interior spaces in the model by forming the interconnecting inner wall structure, leaving a gap between the interconnecting wall structure and the outer wall structure; and
 3) after shrinkage of the interconnecting inner wall structure, closing the gap to join the interconnecting wall structure with the outer wall structure; and f) repeating steps a), b), c), d), and e) as required to complete the model.

45. The method according to claim 44, wherein the gap has a width approximately equal to one half of the width of the outer wall structure.

46. A method of producing a 3-D model by forming a continuous plurality of parallel layers of modeling material comprising the steps of:

a) producing a plurality of bead producing drops of the modeling material for deposition at desired locations to solidify into beads to format least a portion of a layer of said parallel layers;

b) controlling the locations of deposition to produce vectors, defined by overlapping pluralities of the beads, in any and all directions required to produce, by vector plotting, at least a desired outer surface defining wall;

c) timing the production of said plurality of beads, at least, when producing said desired outer surface defining wall to overlap previously deposited beads to a desired extent and to meld with previously deposited beads to produce said vectors, thereby forming said desired outer surface defining wall with a desired surface finish;

d) adjusting the distance of the location of drop production to the location of drop deposition following formation of said layer in preparation for the formation of a subsequent said layer;

e) depositing a plurality of differently colored and transparent build materials in each layer to form a 3-D model in which each layer accurately represents a corresponding slice produced by a medical imaging machine to produce an accurate at least partially transparent biological model;

f) interpolating data between slices produced by the imaging machine and forming layers in the 3-D model that are thinner than the slices produced by the imaging machine, thereby to enhance the resolution of the model; and g) repeating steps a), b), c), d), e), and f) as required to complete the model.

47. A method of producing a 3-D model by forming a contiguous plurality of parallel layers of modeling material comprising the steps of:

a) producing a plurality of bead producing drops of the modeling material for deposition at desired locations to solidify into beads to format least a portion of a layer of said parallel layers;

b) controlling the locations of deposition to produce vectors, defined by overlapping pluralities of the beads, in any and all directions required to produce, by vector plotting, at least a desired outer surface defining wall;

c) timing the production of said plurality of beads, at least, when producing said desired outer surface defining wall to overlap previously deposited beads to a desired extent and to meld with previously deposited beads to produce said vectors, thereby forming said desired outer surface defining wall with a desired surface finish only in portions of the model where said desired surface finish is required;

d) adjusting the distance of the location of drop production to the location of drop deposition following formation of said layer in preparation for the formation of a subsequent said layer;

e) depositing molten modeling material using raster scanning to produce a lattice model structure to be deposited layer upon layer to quickly produce a near net shape model, leaving the lattice model structure exposed, except where closed off by said outer surface defining wall; and f) repeating steps a), b), c), d), and e) as required to complete the model.

48. The method according to claim 47, further comprising the step of depositing support material to form a lattice support structure having an identical lattice as the lattice model structure, to support overhanging portions of the lattice model structure.

49. The method according to claim 47, further comprising the step of sealing the exposed lattice model structure by one of dipping, spraying, brushing and coating a sealing material onto the exposed lattice model structure to one of seal, enclose and fill open spaces in the exposed lattice structure, to produce a near net shape model.

50. The method according to claim 49, further comprising the step of using the near net shape model to form a near net shape mold for casting a near net shape article.

51. The method according to claim 49, comprising forming the near net shape model as a mold for casting a near net shape article.

52. A method of producing a contour mold by forming a contiguous plurality of parallel layers of modeling material comprising the steps of:

a) producing a plurality of bead producing drops of the modeling material for deposition at desired locations to solidify into beads to format least a portion of a layer of said parallel layers;

b) controlling the locations of deposition to produce vectors, defined by overlapping pluralities of the beads, in any and all directions required to produce, by vector plotting, at least a desired outer surface defining wall thereby to define a portion of the interior of the contour mold;

c) timing the production of said plurality of beads, at least, when producing said desired outer surface defining wall to overlap previously deposited beads to a desired extent and to meld with previously deposited beads to produce said vectors, thereby forming said desired outer surface defining wall with a desired surface finish;

d) filling the contour mold with a build material to produce a layer of a molded model, with at least a desired outer surface defining wall of the model, molded by said inner surface defining wall, having a desired surface finish;

e) adjusting the distance of the location of drop production to the location of drop deposition following formation of said layers in preparation for formation of a subsequent said layer;

f) depositing a plurality of differently colored and transparent build materials to form a plurality layers that accurately represent corresponding slices produced by a medical imaging machine, thereby to produce an accurate partially transparent biological model;

g) interpolating data between slices produced by the imaging machine and forming layers in the biological model that are thinner than the slices produced by the imaging machine, thereby to enhance the resolution of the biological model; and h) repeating steps a), b), c), d), e), f), and g) as required to complete the contour model and the molded model.

* * * * *